(12) United States Patent
Gore et al.

(10) Patent No.: US 9,408,220 B2
(45) Date of Patent: Aug. 2, 2016

(54) CHANNEL QUALITY REPORTING FOR ADAPTIVE SECTORIZATION

(75) Inventors: Dhananjay Ashok Gore, San Diego, CA (US); Alexei Gorokhov, San Diego, CA (US); Tingfang Ji, San Diego, CA (US); Aamod Khandekar, San Diego, CA (US); Tamer Kadous, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 278 days.

(21) Appl. No.: 11/261,822

(22) Filed: Oct. 27, 2005

(65) Prior Publication Data

US 2006/0233131 A1  Oct. 19, 2006

Related U.S. Application Data

(60) Provisional application No. 60/672,575, filed on Apr. 19, 2005, provisional application No. 60/710,419, filed on Aug. 22, 2005.

(51) Int. Cl.
*H04Q 7/00* (2006.01)
*H04W 72/08* (2009.01)
(Continued)

(52) U.S. Cl.
CPC ............ *H04W 72/08* (2013.01); *H04B 1/7143* (2013.01); *H04B 7/043* (2013.01); *H04B 7/0689* (2013.01); *H04L 1/0026* (2013.01); *H04L 1/0027* (2013.01); *H04L 1/20* (2013.01); *H04L 5/006* (2013.01); *H04L 5/0037* (2013.01);
(Continued)

(58) Field of Classification Search
CPC ... H04L 1/0071; H04L 1/1864; H04L 5/0053; H04B 7/2606; H04B 74/006; H04B 72/044
USPC ........ 375/295, 340; 455/522, 9, 452.1, 422.1; 370/328, 252, 329, 312
See application file for complete search history.

(56) References Cited

U.S. PATENT DOCUMENTS 4,393,276 A  7/1983 Steele
4,554,668 A  11/1985 Deman et al.
(Continued)

FOREIGN PATENT DOCUMENTS

AU  2005319084  4/2010
CA  2348137  11/2001
(Continued)

OTHER PUBLICATIONS

Dinis, et al., "A Multiple Access Scheme for the Uplink of Broadband Wireless Systems," IEEE Global Telecommunications Conference, 2004, Globecom '04, vol. 6, Nov. 29-Dec. 3, 2004, pp. 3808-3812.
(Continued)

*Primary Examiner* — Phuoc H Doan

(57) ABSTRACT

Apparatuses and methodologies are described that enhance performance in a wireless communication system using beamforming transmissions. According to one aspect, the channel quality is monitored. Channel quality indicators can be used to select a scheduling technique, such as space division multiplexing (SDM), multiple-input multiple output (MIMO) transmission and opportunistic beamforming for one or more user devices. In addition, the CQI can be used to determine the appropriate beam assignment or to update the beam pattern.

36 Claims, 9 Drawing Sheets

(51) Int. Cl.
    *H04B 1/7143*         (2011.01)
    *H04B 7/04*            (2006.01)
    *H04L 1/20*            (2006.01)
    *H04L 1/00*            (2006.01)
    *H04B 7/06*            (2006.01)
    *H04L 5/00*            (2006.01)

(52) U.S. Cl.
    CPC .............. *H04B 7/065* (2013.01); *H04B 7/0632* (2013.01); *H04B 7/0697* (2013.01); *H04L 5/0023* (2013.01); *H04L 5/0051* (2013.01); *H04L 5/0057* (2013.01)

(56) References Cited

U.S. PATENT DOCUMENTS

| | | |
|---|---|---|
| 4,747,137 A | 5/1988 | Matsunaga |
| 4,783,779 A | 11/1988 | Takahata et al. |
| 4,783,780 A | 11/1988 | Alexis |
| 4,975,952 A | 12/1990 | Mabey et al. |
| 5,008,900 A | 4/1991 | Critchlow et al. |
| 5,115,248 A | 5/1992 | Roederer et al. |
| 5,268,694 A | 12/1993 | Jan et al. |
| 5,282,222 A | 1/1994 | Fattouche et al. |
| 5,363,408 A | 11/1994 | Paik et al. |
| 5,371,761 A | 12/1994 | Daffara et al. |
| 5,384,810 A | 1/1995 | Amrany |
| 5,406,551 A | 4/1995 | Saito et al. |
| 5,410,538 A | 4/1995 | Roche et al. |
| 5,455,839 A | 10/1995 | Eyubogiu |
| 5,465,253 A | 11/1995 | Rahnema |
| 5,491,727 A | 2/1996 | Petit |
| 5,513,379 A | 4/1996 | Benveniste et al. |
| 5,539,748 A | 7/1996 | Raith et al. |
| 5,548,582 A | 8/1996 | Brajal et al. |
| 5,553,069 A | 9/1996 | Ueno et al. |
| 5,583,869 A | 12/1996 | Grube et al. |
| 5,594,738 A | 1/1997 | Crisler et al. |
| 5,604,744 A | 2/1997 | Andersson et al. |
| 5,612,978 A | 3/1997 | Blanchard et al. |
| 5,625,876 A | 4/1997 | Gilhousenn et al. |
| 5,684,491 A | 11/1997 | Newman et al. |
| 5,726,978 A | 3/1998 | Frodigh et al. |
| 5,732,113 A | 3/1998 | Schmidl et al. |
| 5,745,487 A | 4/1998 | Hamaki |
| 5,768,276 A | 6/1998 | Diachina et al. |
| 5,790,537 A | 8/1998 | Yoon et al. |
| 5,812,938 A | 9/1998 | Gilhousen et al. |
| 5,815,488 A | 9/1998 | Williams et al. |
| 5,822,368 A | 10/1998 | Wang |
| 5,828,650 A | 10/1998 | Malkamaki et al. |
| 5,838,268 A | 11/1998 | Frenkel |
| 5,867,478 A | 2/1999 | Baum et al. |
| 5,870,393 A | 2/1999 | Yano et al. |
| 5,887,023 A | 3/1999 | Mabuchi |
| 5,907,585 A | 5/1999 | Suzuki et al. |
| 5,920,571 A | 7/1999 | Houck et al. |
| 5,926,470 A | 7/1999 | Tiedemann, Jr. et al. |
| 5,933,421 A | 8/1999 | Alamouti et al. |
| 5,949,814 A | 9/1999 | Odenwalder et al. |
| 5,953,325 A | 9/1999 | Willars |
| 5,955,992 A | 9/1999 | Shattil |
| 5,956,642 A | 9/1999 | Larsson et al. |
| 5,995,992 A | 11/1999 | Eckard |
| 5,999,826 A | 12/1999 | Whinnett |
| 6,002,942 A | 12/1999 | Park et al. |
| 6,016,123 A | 1/2000 | Barton et al. |
| 6,038,263 A | 3/2000 | Kotzin et al. |
| 6,038,450 A | 3/2000 | Brink et al. |
| 6,052,364 A | 4/2000 | Chalmers et al. |
| 6,061,337 A | 5/2000 | Light et al. |
| 6,067,315 A | 5/2000 | Sandin |
| 6,075,350 A | 6/2000 | Peng et al. |
| 6,075,797 A | 6/2000 | Thomas |
| 6,076,114 A | 6/2000 | Wesley et al. |
| 6,088,345 A | 7/2000 | Sakoda et al. |
| 6,088,592 A | 7/2000 | Doner et al. |
| 6,108,323 A | 8/2000 | Gray et al. |
| 6,108,550 A | 8/2000 | Wiorek et al. |
| 6,112,094 A | 8/2000 | Dent |
| 6,128,776 A | 10/2000 | Kang |
| 6,138,037 A | 10/2000 | Jaamies |
| 6,141,317 A | 10/2000 | Marchok et al. |
| 6,154,484 A | 11/2000 | Lee et al. |
| 6,169,910 B1 | 1/2001 | Tamil et al. |
| 6,172,993 B1 | 1/2001 | Kim et al. |
| 6,175,550 B1 | 1/2001 | van Nee |
| 6,175,650 B1 | 1/2001 | Sindhu et al. |
| 6,176,550 B1 | 1/2001 | Lamart et al. |
| 6,198,775 B1 | 3/2001 | Khayrallah et al. |
| 6,215,983 B1 | 4/2001 | Dogan et al. |
| 6,226,280 B1 | 5/2001 | Roark et al. |
| 6,232,918 B1 | 5/2001 | Wax et al. |
| 6,240,129 B1 | 5/2001 | Reusens et al. |
| 6,249,683 B1 | 6/2001 | Lundby et al. |
| 6,256,478 B1 | 7/2001 | Allen et al. |
| 6,271,946 B1 | 8/2001 | Chang et al. |
| 6,272,122 B1 | 8/2001 | Wee et al. |
| 6,310,704 B1 | 10/2001 | Dogan et al. |
| 6,317,435 B1 | 11/2001 | Tiedemann, Jr. et al. |
| 6,335,922 B1 | 1/2002 | Tiedemann, Jr. et al. |
| 6,337,659 B1 | 1/2002 | Kim et al. |
| 6,337,983 B1 | 1/2002 | Bonta et al. |
| 6,353,637 B1 | 3/2002 | Mansour et al. |
| 6,363,060 B1 | 3/2002 | Sarkar |
| 6,374,115 B1 | 4/2002 | Barnes et al. |
| 6,377,539 B1 | 4/2002 | Kang et al. |
| 6,377,809 B1 | 4/2002 | Rezaiifar et al. |
| 6,388,998 B1 | 5/2002 | Kasturia |
| 6,393,008 B1 | 5/2002 | Cheng et al. |
| 6,393,012 B1 | 5/2002 | Pankaj |
| 6,401,062 B1 | 6/2002 | Murashima |
| 6,438,369 B1 | 8/2002 | Huang et al. |
| 6,449,246 B1 | 9/2002 | Barton et al. |
| 6,466,800 B1 | 10/2002 | Sydon et al. |
| 6,473,467 B1 | 10/2002 | Wallace et al. |
| 6,477,317 B1 | 11/2002 | Itokawa |
| 6,478,422 B1 | 11/2002 | Hansen |
| 6,483,820 B1 | 11/2002 | Davidson et al. |
| 6,487,243 B1 | 11/2002 | Hwang et al. |
| 6,496,790 B1 | 12/2002 | Kathavate et al. |
| 6,501,810 B1 | 12/2002 | Karim et al. |
| 6,507,601 B2 | 1/2003 | Parsa et al. |
| 6,519,462 B1 | 2/2003 | Lu et al. |
| 6,529,525 B1 | 3/2003 | Pecen et al. |
| 6,535,666 B1 | 3/2003 | Dogan et al. |
| 6,539,008 B1 | 3/2003 | Ahn et al. |
| 6,539,213 B1 | 3/2003 | Richards et al. |
| 6,542,485 B1 | 4/2003 | Mujtaba |
| 6,542,743 B1 | 4/2003 | Soliman |
| 6,563,806 B1 | 5/2003 | Yano et al. |
| 6,563,881 B1 | 5/2003 | Sakoda et al. |
| 6,577,739 B1 | 6/2003 | Hurtig et al. |
| 6,584,140 B1 | 6/2003 | Lee |
| 6,590,881 B1 | 7/2003 | Wallace et al. |
| 6,597,746 B1 | 7/2003 | Amrany et al. |
| 6,601,206 B1 | 7/2003 | Marvasti |
| 6,614,857 B1 | 9/2003 | Buehrer et al. |
| 6,625,172 B2 | 9/2003 | Odenwalder et al. |
| 6,636,568 B2 | 10/2003 | Kadous |
| 6,654,339 B1 | 11/2003 | Bohnke et al. |
| 6,654,431 B1 | 11/2003 | Barton et al. |
| 6,657,949 B1 | 12/2003 | Jones, IV et al. |
| 6,658,258 B1 | 12/2003 | Chen et al. |
| 6,674,787 B1 | 1/2004 | Dick et al. |
| 6,674,810 B1 | 1/2004 | Cheng |
| 6,675,012 B2 | 1/2004 | Gray et al. |
| 6,678,318 B1 | 1/2004 | Lai |
| 6,690,951 B1 | 2/2004 | Cuffaro et al. |
| 6,693,952 B1 | 2/2004 | Chuah et al. |
| 6,701,165 B1 | 3/2004 | Ho et al. |
| 6,704,571 B1 | 3/2004 | Moon |
| 6,711,400 B1 | 3/2004 | Aura et al. |
| 6,717,908 B2 | 4/2004 | Vijayan et al. |

(56) References Cited

U.S. PATENT DOCUMENTS

| | | |
|---|---|---|
| 6,721,568 B1 | 4/2004 | Gustavsson et al. |
| 6,724,719 B1 | 4/2004 | Tong et al. |
| 6,731,602 B1 | 5/2004 | Watanabe et al. |
| 6,735,244 B1 | 5/2004 | Hasegawa et al. |
| 6,744,743 B2 | 6/2004 | Walton et al. |
| 6,748,220 B1 | 6/2004 | Chow et al. |
| 6,751,444 B1 | 6/2004 | Meiyappan |
| 6,751,456 B2 | 6/2004 | Bilgic et al. |
| 6,754,511 B1 | 6/2004 | Halford et al. |
| 6,763,009 B1 | 7/2004 | Bedekar et al. |
| 6,765,969 B1 | 7/2004 | Vook et al. |
| 6,776,165 B2 | 8/2004 | Jin et al. |
| 6,776,765 B2 | 8/2004 | Soukup et al. |
| 6,778,513 B2 | 8/2004 | Kasapi et al. |
| 6,785,341 B2 | 8/2004 | Walton et al. |
| 6,798,736 B1 | 9/2004 | Black et al. |
| 6,799,043 B2 | 9/2004 | Tiedemann, Jr. et al. |
| 6,802,035 B2 | 10/2004 | Catreux et al. |
| 6,804,307 B1 | 10/2004 | Popovic |
| 6,813,284 B2 | 11/2004 | Vayanos et al. |
| 6,821,535 B2 | 11/2004 | Nurmi et al. |
| 6,828,293 B1 | 12/2004 | Hazenkamp et al. |
| 6,829,293 B2 | 12/2004 | Jones et al. |
| 6,831,943 B1 | 12/2004 | Dabak et al. |
| 6,842,487 B1 | 1/2005 | Larsson |
| 6,850,481 B2 | 2/2005 | Wu et al. |
| 6,850,509 B2 | 2/2005 | Lee et al. |
| 6,862,271 B2 | 3/2005 | Medvedev et al. |
| 6,870,808 B1 | 3/2005 | Liu |
| 6,870,826 B1 | 3/2005 | Ishizu |
| 6,904,097 B2 | 6/2005 | Agami et al. |
| 6,904,283 B2 | 6/2005 | Li et al. |
| 6,904,550 B2 | 6/2005 | Sibecas et al. |
| 6,907,020 B2 | 6/2005 | Periyalwar et al. |
| 6,907,269 B2 | 6/2005 | Yamaguchi et al. |
| 6,909,707 B2 | 6/2005 | Rotstein et al. |
| 6,909,797 B2 | 6/2005 | Romsdahl et al. |
| 6,917,602 B2 | 7/2005 | Toskala et al. |
| 6,917,821 B2 | 7/2005 | Kadous et al. |
| 6,927,728 B2 | 8/2005 | Vook et al. |
| 6,928,047 B1 | 8/2005 | Xia |
| 6,934,266 B2 | 8/2005 | Dulin et al. |
| 6,934,275 B1 | 8/2005 | Love et al. |
| 6,934,340 B1 | 8/2005 | Dollard et al. |
| 6,940,827 B2 | 9/2005 | Li et al. |
| 6,940,842 B2 | 9/2005 | Proctor, Jr. |
| 6,940,845 B2 | 9/2005 | Benveniste et al. |
| 6,954,448 B2 | 10/2005 | Farley et al. |
| 6,954,481 B1 | 10/2005 | Laroia et al. |
| 6,954,622 B2 | 10/2005 | Nelson et al. |
| 6,961,364 B1 | 11/2005 | Laroia et al. |
| 6,963,543 B2 | 11/2005 | Diep et al. |
| 6,970,682 B2 | 11/2005 | Crilly, Jr. et al. |
| 6,975,868 B2 | 12/2005 | Joshi et al. |
| 6,980,540 B1 | 12/2005 | Laroia et al. |
| 6,985,434 B2 | 1/2006 | Wu et al. |
| 6,985,453 B2 | 1/2006 | Lundby et al. |
| 6,985,466 B1 | 1/2006 | Yun et al. |
| 6,985,498 B2 | 1/2006 | Laroia et al. |
| 6,987,746 B1 | 1/2006 | Song |
| 6,993,342 B2 | 1/2006 | Kuchibhotla et al. |
| 7,002,900 B2 | 2/2006 | Walton et al. |
| 7,006,529 B2 | 2/2006 | Alastalo et al. |
| 7,006,557 B2 | 2/2006 | Subrahmanya et al. |
| 7,006,848 B2 | 2/2006 | Ling et al. |
| 7,009,500 B2 | 3/2006 | Rao et al. |
| 7,010,048 B1 | 3/2006 | Shattil |
| 7,013,143 B2 | 3/2006 | Love et al. |
| 7,016,318 B2 | 3/2006 | Pankaj et al. |
| 7,016,319 B2 | 3/2006 | Baum et al. |
| 7,016,425 B1 | 3/2006 | Kraiem |
| 7,020,110 B2 | 3/2006 | Walton et al. |
| 7,039,356 B2 | 5/2006 | Nguyen et al. |
| 7,039,370 B2 | 5/2006 | Laroia et al. |
| 7,042,856 B2 | 5/2006 | Walton et al. |
| 7,042,857 B2 | 5/2006 | Krishnan et al. |
| 7,047,006 B2 | 5/2006 | Classon et al. |
| 7,050,402 B2 | 5/2006 | Schmidl et al. |
| 7,050,405 B2 | 5/2006 | Attar et al. |
| 7,050,759 B2 | 5/2006 | Gaal et al. |
| 7,054,301 B1 | 5/2006 | Sousa et al. |
| 7,061,898 B2 | 6/2006 | Hashmen et al. |
| 7,069,009 B2 | 6/2006 | Li et al. |
| 7,072,315 B1 | 7/2006 | Liu et al. |
| 7,079,867 B2 | 7/2006 | Chun et al. |
| 7,085,574 B2 | 8/2006 | Gaal et al. |
| 7,095,708 B1 | 8/2006 | Alamouti et al. |
| 7,095,709 B2 | 8/2006 | Walton et al. |
| 7,099,299 B2 | 8/2006 | Liang et al. |
| 7,099,630 B2 | 8/2006 | Brunner et al. |
| 7,103,384 B2 | 9/2006 | Chun |
| 7,106,319 B2 | 9/2006 | Ishiyama |
| 7,113,808 B2 | 9/2006 | Hwang et al. |
| 7,120,134 B2 | 10/2006 | Tiedemann, Jr. et al. |
| 7,120,395 B2 | 10/2006 | Tong et al. |
| 7,126,928 B2 | 10/2006 | Tiedemann, Jr. et al. |
| 7,133,460 B2 | 11/2006 | Bae et al. |
| 7,139,328 B2 | 11/2006 | Thomas et al. |
| 7,142,864 B2 | 11/2006 | Laroia et al. |
| 7,145,940 B2 | 12/2006 | Gore et al. |
| 7,145,959 B2 | 12/2006 | Harel et al. |
| 7,149,199 B2 | 12/2006 | Sung et al. |
| 7,149,238 B2 | 12/2006 | Agee et al. |
| 7,151,761 B1 | 12/2006 | Palenius et al. |
| 7,151,936 B2 | 12/2006 | Wager et al. |
| 7,154,936 B2 | 12/2006 | Bjerke et al. |
| 7,155,236 B2 | 12/2006 | Chen et al. |
| 7,157,351 B2 | 1/2007 | Cheng et al. |
| 7,161,971 B2 | 1/2007 | Tiedemann, Jr. et al. |
| 7,164,649 B2 | 1/2007 | Walton et al. |
| 7,164,696 B2 | 1/2007 | Sano et al. |
| 7,167,916 B2 | 1/2007 | Willen et al. |
| 7,170,937 B2 | 1/2007 | Zhou |
| 7,177,297 B2 | 2/2007 | Agrawal et al. |
| 7,177,351 B2 | 2/2007 | Kadous |
| 7,180,627 B2 | 2/2007 | Moylan et al. |
| 7,181,170 B2 | 2/2007 | Love et al. |
| 7,184,426 B2 | 2/2007 | Padovani et al. |
| 7,184,713 B2 | 2/2007 | Kadous et al. |
| 7,188,300 B2 | 3/2007 | Eriksson et al. |
| 7,197,282 B2 | 3/2007 | Dent et al. |
| 7,200,177 B2 | 4/2007 | Miyoshi |
| 7,209,712 B2 | 4/2007 | Holtzman et al. |
| 7,215,979 B2 | 5/2007 | Nakagawa et al. |
| 7,230,942 B2 | 6/2007 | Laroia et al. |
| 7,233,634 B1 | 6/2007 | Hassell Sweatman et al. |
| 7,236,747 B1 | 6/2007 | Meacham et al. |
| 7,242,722 B2 | 7/2007 | Krauss et al. |
| 7,243,150 B2 | 7/2007 | Sher et al. |
| 7,248,559 B2 | 7/2007 | Ma et al. |
| 7,248,841 B2 | 7/2007 | Agee et al. |
| 7,254,158 B2 | 8/2007 | Agrawal et al. |
| 7,257,167 B2 | 8/2007 | Lau et al. |
| 7,257,406 B2 | 8/2007 | Ji et al. |
| 7,257,423 B2 | 8/2007 | Iochi |
| 7,260,153 B2 | 8/2007 | Nissani et al. |
| 7,280,467 B2 | 10/2007 | Smee et al. |
| 7,289,570 B2 | 10/2007 | Schmidl et al. |
| 7,289,585 B2 | 10/2007 | Sandhu et al. |
| 7,290,195 B2 | 10/2007 | Guo et al. |
| 7,292,651 B2 | 11/2007 | Li |
| 7,292,863 B2 | 11/2007 | Chen et al. |
| 7,295,509 B2 | 11/2007 | Laroia et al. |
| 7,313,086 B2 | 12/2007 | Aizawa et al. |
| 7,313,126 B2 | 12/2007 | Yun et al. |
| 7,313,174 B2 | 12/2007 | Alard et al. |
| 7,313,407 B2 | 12/2007 | Shapira |
| 7,327,812 B2 | 2/2008 | Auer |
| 7,330,701 B2 | 2/2008 | Mukkavilli et al. |
| 7,336,727 B2 | 2/2008 | Mukkavilli et al. |
| 7,349,371 B2 | 3/2008 | Schein |
| 7,349,667 B2 | 3/2008 | Magee et al. |
| 7,356,000 B2 | 4/2008 | Oprescu-Surcobe et al. |
| 7,356,005 B2 | 4/2008 | Derryberry et al. |

(56) References Cited

U.S. PATENT DOCUMENTS

| | | |
|---|---|---|
| 7,356,073 B2 | 4/2008 | Heikkila |
| 7,359,327 B2 | 4/2008 | Oshiba |
| 7,363,055 B2 | 4/2008 | Castrogiovanni et al. |
| 7,366,223 B1 | 4/2008 | Chen et al. |
| 7,366,253 B2 | 4/2008 | Kim et al. |
| 7,366,520 B2 | 4/2008 | Haustein et al. |
| 7,369,531 B2 | 5/2008 | Cho et al. |
| 7,372,911 B1 | 5/2008 | Lindskog et al. |
| 7,372,912 B2 | 5/2008 | Seo et al. |
| 7,379,489 B2 | 5/2008 | Zuniga et al. |
| 7,382,764 B2 | 6/2008 | Uehara et al. |
| 7,392,014 B2 | 6/2008 | Baker et al. |
| 7,394,865 B2 | 7/2008 | Borran et al. |
| 7,403,745 B2 | 7/2008 | Dominique et al. |
| 7,403,748 B1 | 7/2008 | Keskitalo et al. |
| 7,406,119 B2 | 7/2008 | Yamano et al. |
| 7,406,336 B2 | 7/2008 | Astely et al. |
| 7,411,898 B2 | 8/2008 | Erlich et al. |
| 7,412,212 B2 | 8/2008 | Hottinen |
| 7,418,043 B2 | 8/2008 | Shattil |
| 7,418,246 B2 | 8/2008 | Kim et al. |
| 7,423,991 B2 | 9/2008 | Cho et al. |
| 7,426,426 B2 | 9/2008 | Van Baren et al. |
| 7,428,426 B2 | 9/2008 | Kiran et al. |
| 7,433,661 B2 | 10/2008 | Kogiantis et al. |
| 7,437,164 B2 | 10/2008 | Agrawal et al. |
| 7,443,835 B2 | 10/2008 | Lakshmi Narayanan et al. |
| 7,447,270 B1 | 11/2008 | Hottinen et al. |
| 7,450,532 B2 | 11/2008 | Chae et al. |
| 7,450,548 B2 | 11/2008 | Haustein et al. |
| 7,460,466 B2 | 12/2008 | Lee et al. |
| 7,463,698 B2 | 12/2008 | Fujii et al. |
| 7,468,943 B2 | 12/2008 | Gu et al. |
| 7,469,011 B2 | 12/2008 | Lin et al. |
| 7,471,963 B2 | 12/2008 | Kim et al. |
| 7,483,408 B2 | 1/2009 | Bevan et al. |
| 7,483,719 B2 | 1/2009 | Kim et al. |
| 7,486,408 B2 | 2/2009 | Van Der Schaar et al. |
| 7,486,735 B2 | 2/2009 | Dubuc et al. |
| 7,492,788 B2 | 2/2009 | Zhang et al. |
| 7,499,393 B2 | 3/2009 | Ozluturk et al. |
| 7,508,748 B2 | 3/2009 | Kadous |
| 7,508,842 B2 | 3/2009 | Baum et al. |
| 7,512,096 B2 | 3/2009 | Kuzminskiy et al. |
| 7,545,867 B1 | 6/2009 | Lou et al. |
| 7,548,506 B2 | 6/2009 | Ma et al. |
| 7,551,546 B2 | 6/2009 | Ma et al. |
| 7,551,564 B2 | 6/2009 | Mattina |
| 7,558,293 B2 | 7/2009 | Choi et al. |
| 7,567,621 B2 | 7/2009 | Sampath et al. |
| 7,573,900 B2 | 8/2009 | Kim et al. |
| 7,599,327 B2 | 10/2009 | Zhuang |
| 7,616,955 B2 | 11/2009 | Kim et al. |
| 7,627,051 B2 | 12/2009 | Shen et al. |
| 7,664,061 B2 | 2/2010 | Hottinen |
| 7,676,007 B1 | 3/2010 | Choi et al. |
| 7,684,507 B2 | 3/2010 | Levy |
| 7,724,777 B2 | 5/2010 | Sutivong et al. |
| 7,768,979 B2 | 8/2010 | Sutivong et al. |
| 7,899,497 B2 | 3/2011 | Kish et al. |
| 7,916,624 B2 | 3/2011 | Laroia et al. |
| 7,924,699 B2 | 4/2011 | Laroia et al. |
| 7,990,843 B2 | 8/2011 | Laroia et al. |
| 7,990,844 B2 | 8/2011 | Laroia et al. |
| 8,031,583 B2 | 10/2011 | Classon et al. |
| 8,045,512 B2 | 10/2011 | Khandekar et al. |
| 8,095,141 B2 | 1/2012 | Teague |
| 8,098,568 B2 | 1/2012 | Laroia et al. |
| 8,098,569 B2 | 1/2012 | Laroia et al. |
| 8,199,634 B2 | 6/2012 | Laroia et al. |
| 8,218,425 B2 | 7/2012 | Laroia et al. |
| 8,223,627 B2 | 7/2012 | Laroia et al. |
| 8,462,859 B2 | 6/2013 | Sampath et al. |
| 8,477,684 B2 | 7/2013 | Khandekar et al. |
| 8,582,509 B2 | 11/2013 | Khandekar et al. |
| 8,582,548 B2 | 11/2013 | Gore et al. |
| 2001/0021180 A1 | 9/2001 | Lee et al. |
| 2001/0021650 A1 | 9/2001 | Bilgic et al. |
| 2001/0024427 A1 | 9/2001 | Suzuki |
| 2001/0030948 A1 | 10/2001 | Tiedemann, Jr. |
| 2001/0047424 A1 | 11/2001 | Alastalo et al. |
| 2001/0053140 A1 | 12/2001 | Choi et al. |
| 2001/0055294 A1 | 12/2001 | Motoyoshi et al. |
| 2001/0055297 A1 | 12/2001 | Benveniste et al. |
| 2002/0000948 A1 | 1/2002 | Chun et al. |
| 2002/0015405 A1 | 2/2002 | Sepponen et al. |
| 2002/0018157 A1 | 2/2002 | Zhang et al. |
| 2002/0039912 A1 | 4/2002 | Yamaguchi et al. |
| 2002/0044524 A1 | 4/2002 | Laroia et al. |
| 2002/0058525 A1 | 5/2002 | Kasapi et al. |
| 2002/0061742 A1 | 5/2002 | Lapaille et al. |
| 2002/0077152 A1 | 6/2002 | Johnson et al. |
| 2002/0085521 A1 | 7/2002 | Tripathi et al. |
| 2002/0090004 A1 | 7/2002 | Rinchiuso |
| 2002/0090024 A1 | 7/2002 | Tan et al. |
| 2002/0101839 A1 | 8/2002 | Farley et al. |
| 2002/0122381 A1 | 9/2002 | Wu et al. |
| 2002/0122400 A1 | 9/2002 | Vayanos et al. |
| 2002/0122403 A1 | 9/2002 | Hashem et al. |
| 2002/0128035 A1 | 9/2002 | Jokinen et al. |
| 2002/0147953 A1 | 10/2002 | Catreux et al. |
| 2002/0159422 A1 | 10/2002 | Li et al. |
| 2002/0160769 A1 | 10/2002 | Gray et al. |
| 2002/0160781 A1 | 10/2002 | Bark et al. |
| 2002/0168946 A1 | 11/2002 | Aizawa et al. |
| 2002/0172293 A1 | 11/2002 | Kuchi et al. |
| 2002/0176398 A1 | 11/2002 | Nidda |
| 2002/0181571 A1 | 12/2002 | Yamano et al. |
| 2002/0191569 A1 | 12/2002 | Sung et al. |
| 2002/0193146 A1 | 12/2002 | Wallace et al. |
| 2003/0002464 A1 | 1/2003 | Rezaiifar et al. |
| 2003/0020651 A1 | 1/2003 | Crilly, Jr. et al. |
| 2003/0027579 A1 | 2/2003 | Sydon |
| 2003/0035491 A1 | 2/2003 | Walton et al. |
| 2003/0036359 A1 | 2/2003 | Dent et al. |
| 2003/0040283 A1 | 2/2003 | Kawai et al. |
| 2003/0043732 A1 | 3/2003 | Walton et al. |
| 2003/0043764 A1 | 3/2003 | Kim et al. |
| 2003/0063579 A1 | 4/2003 | Lee |
| 2003/0068983 A1 | 4/2003 | Kim et al. |
| 2003/0072254 A1 | 4/2003 | Ma et al. |
| 2003/0072255 A1 | 4/2003 | Ma et al. |
| 2003/0072280 A1 | 4/2003 | McFarland et al. |
| 2003/0072395 A1 | 4/2003 | Jia et al. |
| 2003/0073409 A1 | 4/2003 | Nobukiyo et al. |
| 2003/0073464 A1 | 4/2003 | Giannakis et al. |
| 2003/0076890 A1 | 4/2003 | Hochwald et al. |
| 2003/0086371 A1 | 5/2003 | Walton et al. |
| 2003/0086393 A1 | 5/2003 | Vasudevan et al. |
| 2003/0096579 A1 | 5/2003 | Ito et al. |
| 2003/0103520 A1 | 6/2003 | Chen et al. |
| 2003/0109226 A1 | 6/2003 | Brunner et al. |
| 2003/0109266 A1 | 6/2003 | Rafiah et al. |
| 2003/0112745 A1 | 6/2003 | Zhuang et al. |
| 2003/0123414 A1 | 7/2003 | Tong et al. |
| 2003/0125040 A1 | 7/2003 | Walton et al. |
| 2003/0128658 A1 | 7/2003 | Walton et al. |
| 2003/0133426 A1 | 7/2003 | Schein et al. |
| 2003/0142648 A1 | 7/2003 | Semper |
| 2003/0142729 A1 | 7/2003 | Subrahmanya et al. |
| 2003/0147371 A1 | 8/2003 | Choi et al. |
| 2003/0161281 A1 | 8/2003 | Dulin et al. |
| 2003/0161282 A1 | 8/2003 | Medvedev et al. |
| 2003/0165189 A1 | 9/2003 | Kadous et al. |
| 2003/0181163 A1 | 9/2003 | Ofuji et al. |
| 2003/0181170 A1 | 9/2003 | Sim |
| 2003/0185310 A1 | 10/2003 | Ketchum et al. |
| 2003/0190897 A1 | 10/2003 | Lei et al. |
| 2003/0193915 A1 | 10/2003 | Lee et al. |
| 2003/0202491 A1 | 10/2003 | Tiedemann, Jr. et al. |
| 2003/0202560 A1 | 10/2003 | Tiedemann, Jr. et al. |
| 2003/0216156 A1 | 11/2003 | Chun et al. |
| 2003/0228850 A1 | 12/2003 | Hwang |
| 2003/0235255 A1 | 12/2003 | Ketchum et al. |

(56) References Cited

U.S. PATENT DOCUMENTS

| | | |
|---|---|---|
| 2004/0001429 A1 | 1/2004 | Ma et al. |
| 2004/0001460 A1 | 1/2004 | Bevan et al. |
| 2004/0002364 A1 | 1/2004 | Trikkonen et al. |
| 2004/0009783 A1 | 1/2004 | Miyoshi et al. |
| 2004/0010623 A1 | 1/2004 | Sher et al. |
| 2004/0015692 A1 | 1/2004 | Green et al. |
| 2004/0017785 A1 | 1/2004 | Zelst |
| 2004/0032443 A1 | 2/2004 | Moylan et al. |
| 2004/0042558 A1 | 3/2004 | Hwang et al. |
| 2004/0048609 A1 | 3/2004 | Kosaka et al. |
| 2004/0048630 A1 | 3/2004 | Shapira et al. |
| 2004/0054999 A1 | 3/2004 | Willen et al. |
| 2004/0057394 A1 | 3/2004 | Holtzman et al. |
| 2004/0058687 A1 | 3/2004 | Kim et al. |
| 2004/0066754 A1* | 4/2004 | Hottinen .................. 370/252 |
| 2004/0066761 A1 | 4/2004 | Giannakis et al. |
| 2004/0066772 A1 | 4/2004 | Moon et al. |
| 2004/0067756 A1 | 4/2004 | Wager et al. |
| 2004/0072565 A1 | 4/2004 | Nobukiyo et al. |
| 2004/0076185 A1 | 4/2004 | Kim et al. |
| 2004/0077345 A1 | 4/2004 | Turner et al. |
| 2004/0077379 A1 | 4/2004 | Smith et al. |
| 2004/0081073 A1 | 4/2004 | Walton et al. |
| 2004/0081195 A1 | 4/2004 | El-Maleh et al. |
| 2004/0087325 A1 | 5/2004 | Cheng et al. |
| 2004/0095907 A1 | 5/2004 | Agee et al. |
| 2004/0097215 A1 | 5/2004 | Abe et al. |
| 2004/0097240 A1 | 5/2004 | Chen et al. |
| 2004/0098505 A1 | 5/2004 | Clemmensen |
| 2004/0105489 A1 | 6/2004 | Kim et al. |
| 2004/0114618 A1 | 6/2004 | Tong et al. |
| 2004/0120411 A1 | 6/2004 | Walton et al. |
| 2004/0125792 A1 | 7/2004 | Bradbury et al. |
| 2004/0128605 A1 | 7/2004 | Sibecas et al. |
| 2004/0131007 A1 | 7/2004 | Smee et al. |
| 2004/0131008 A1 | 7/2004 | Zuniga et al. |
| 2004/0131038 A1 | 7/2004 | Kim et al. |
| 2004/0131110 A1 | 7/2004 | Alard et al. |
| 2004/0136344 A1 | 7/2004 | Kim et al. |
| 2004/0136349 A1 | 7/2004 | Walton et al. |
| 2004/0156328 A1 | 8/2004 | Walton et al. |
| 2004/0160914 A1 | 8/2004 | Sarkar et al. |
| 2004/0160933 A1 | 8/2004 | Odenwalder et al. |
| 2004/0162083 A1 | 8/2004 | Chen et al. |
| 2004/0165564 A1 | 8/2004 | Kim et al. |
| 2004/0166867 A1 | 8/2004 | Hawe et al. |
| 2004/0166887 A1* | 8/2004 | Laroia et al. .................. 455/522 |
| 2004/0170152 A1 | 9/2004 | Nagao et al. |
| 2004/0170157 A1 | 9/2004 | Kim et al. |
| 2004/0171384 A1 | 9/2004 | Holma et al. |
| 2004/0171385 A1 | 9/2004 | Haustein et al. |
| 2004/0178954 A1 | 9/2004 | Vook et al. |
| 2004/0179480 A1 | 9/2004 | Attar et al. |
| 2004/0179494 A1 | 9/2004 | Attar et al. |
| 2004/0179506 A1 | 9/2004 | Padovani et al. |
| 2004/0179627 A1 | 9/2004 | Ketchum et al. |
| 2004/0181569 A1 | 9/2004 | Attar et al. |
| 2004/0185792 A1 | 9/2004 | Alexiou et al. |
| 2004/0190640 A1 | 9/2004 | Dubuc et al. |
| 2004/0202257 A1 | 10/2004 | Mehta et al. |
| 2004/0208138 A1 | 10/2004 | Hayashi et al. |
| 2004/0218520 A1 | 11/2004 | Aizawa et al. |
| 2004/0219819 A1 | 11/2004 | Di Mascio et al. |
| 2004/0219919 A1 | 11/2004 | Whinnett et al. |
| 2004/0224711 A1 | 11/2004 | Panchal et al. |
| 2004/0228267 A1 | 11/2004 | Agrawal et al. |
| 2004/0228313 A1 | 11/2004 | Cheng et al. |
| 2004/0229615 A1 | 11/2004 | Agrawal et al. |
| 2004/0240419 A1 | 12/2004 | Abrishamkar et al. |
| 2004/0240572 A1 | 12/2004 | Brutel et al. |
| 2004/0248604 A1 | 12/2004 | Vaidyanathan et al. |
| 2004/0252529 A1 | 12/2004 | Huber et al. |
| 2004/0252629 A1 | 12/2004 | Hasegawa et al. |
| 2004/0252655 A1 | 12/2004 | Lim et al. |
| 2004/0252662 A1 | 12/2004 | Cho |
| 2004/0257979 A1 | 12/2004 | Ro et al. |
| 2004/0264507 A1 | 12/2004 | Cho et al. |
| 2004/0264585 A1 | 12/2004 | Borran et al. |
| 2004/0264593 A1 | 12/2004 | Shim et al. |
| 2005/0002412 A1 | 1/2005 | Sagfors et al. |
| 2005/0002440 A1 | 1/2005 | Alamouti et al. |
| 2005/0002467 A1 | 1/2005 | Seo et al. |
| 2005/0002468 A1 | 1/2005 | Walton et al. |
| 2005/0003782 A1 | 1/2005 | Wintzell |
| 2005/0008091 A1 | 1/2005 | Boutros et al. |
| 2005/0009486 A1 | 1/2005 | Al-Dhahir et al. |
| 2005/0013263 A1 | 1/2005 | Kim et al. |
| 2005/0025093 A1 | 2/2005 | Yun et al. |
| 2005/0030886 A1 | 2/2005 | Wu et al. |
| 2005/0030964 A1 | 2/2005 | Tiedemann, Jr. et al. |
| 2005/0034079 A1 | 2/2005 | Gunasekar et al. |
| 2005/0041611 A1 | 2/2005 | Sandhu |
| 2005/0041618 A1 | 2/2005 | Wei et al. |
| 2005/0041750 A1 | 2/2005 | Lau et al. |
| 2005/0041775 A1 | 2/2005 | Batzinger et al. |
| 2005/0044206 A1 | 2/2005 | Johansson et al. |
| 2005/0047517 A1 | 3/2005 | Georgios et al. |
| 2005/0052991 A1 | 3/2005 | Kadous et al. |
| 2005/0053081 A1 | 3/2005 | Andersson et al. |
| 2005/0053151 A1 | 3/2005 | Lin et al. |
| 2005/0063298 A1 | 3/2005 | Ling et al. |
| 2005/0068921 A1 | 3/2005 | Liu |
| 2005/0073976 A1 | 4/2005 | Fujii |
| 2005/0084000 A1 | 4/2005 | Krauss et al. |
| 2005/0085195 A1 | 4/2005 | Tong et al. |
| 2005/0085197 A1 | 4/2005 | Laroia et al. |
| 2005/0085236 A1 | 4/2005 | Gerlach et al. |
| 2005/0111397 A1 | 5/2005 | Attar et al. |
| 2005/0113100 A1 | 5/2005 | Oprescu-Surcobe et al. |
| 2005/0122898 A1 | 6/2005 | Jang et al. |
| 2005/0128683 A1 | 6/2005 | Watanabe et al. |
| 2005/0128983 A1 | 6/2005 | Kim et al. |
| 2005/0135324 A1 | 6/2005 | Kim et al. |
| 2005/0135498 A1 | 6/2005 | Yee |
| 2005/0141624 A1 | 6/2005 | Lakshmipathi et al. |
| 2005/0147024 A1 | 7/2005 | Jung et al. |
| 2005/0147025 A1 | 7/2005 | Auer et al. |
| 2005/0152484 A1 | 7/2005 | Sandhu et al. |
| 2005/0157807 A1 | 7/2005 | Shim et al. |
| 2005/0159162 A1 | 7/2005 | Park |
| 2005/0164709 A1 | 7/2005 | Balasubramanian et al. |
| 2005/0165949 A1 | 7/2005 | Teague |
| 2005/0174981 A1 | 8/2005 | Heath et al. |
| 2005/0175070 A1 | 8/2005 | Grob et al. |
| 2005/0180311 A1 | 8/2005 | Wang et al. |
| 2005/0180313 A1 | 8/2005 | Kim et al. |
| 2005/0181799 A1 | 8/2005 | Laroia et al. |
| 2005/0192011 A1 | 9/2005 | Hong et al. |
| 2005/0195733 A1 | 9/2005 | Walton et al. |
| 2005/0195852 A1 | 9/2005 | Vayanos et al. |
| 2005/0195886 A1 | 9/2005 | Lampinen et al. |
| 2005/0201296 A1 | 9/2005 | Vannithamby et al. |
| 2005/0204247 A1 | 9/2005 | Guo et al. |
| 2005/0207367 A1 | 9/2005 | Onggosanusi et al. |
| 2005/0215196 A1 | 9/2005 | Krishnan et al. |
| 2005/0215251 A1 | 9/2005 | Krishnan et al. |
| 2005/0226204 A1 | 10/2005 | Uehara et al. |
| 2005/0239465 A1 | 10/2005 | Lee et al. |
| 2005/0243791 A1 | 11/2005 | Park et al. |
| 2005/0246548 A1 | 11/2005 | Laitinen et al. |
| 2005/0249266 A1 | 11/2005 | Brown et al. |
| 2005/0254416 A1 | 11/2005 | Laroia et al. |
| 2005/0254467 A1 | 11/2005 | Li et al. |
| 2005/0254477 A1 | 11/2005 | Lee et al. |
| 2005/0254556 A1 | 11/2005 | Fujii et al. |
| 2005/0259005 A1 | 11/2005 | Chiang et al. |
| 2005/0259723 A1 | 11/2005 | Blanchard et al. |
| 2005/0259757 A1 | 11/2005 | Wu et al. |
| 2005/0265220 A1 | 12/2005 | Erlich et al. |
| 2005/0265293 A1 | 12/2005 | Ro et al. |
| 2005/0265470 A1 | 12/2005 | Kishigami et al. |
| 2005/0271012 A1 | 12/2005 | Agrawal et al. |
| 2005/0276347 A1 | 12/2005 | Mujtaba et al. |
| 2005/0276348 A1 | 12/2005 | Vandenameele |

(56) References Cited

U.S. PATENT DOCUMENTS

| | | |
|---|---|---|
| 2005/0277423 A1 | 12/2005 | Sandhu et al. |
| 2005/0281029 A1 | 12/2005 | Inamoto et al. |
| 2005/0281290 A1 | 12/2005 | Khandekar et al. |
| 2005/0282500 A1 | 12/2005 | Wang et al. |
| 2005/0286408 A1 | 12/2005 | Jin et al. |
| 2005/0289256 A1 | 12/2005 | Cudak et al. |
| 2006/0002451 A1 | 1/2006 | Fukuta et al. |
| 2006/0013285 A1 | 1/2006 | Kobayashi et al. |
| 2006/0018336 A1 | 1/2006 | Sutivong et al. |
| 2006/0018347 A1 | 1/2006 | Agrawal et al. |
| 2006/0018397 A1 | 1/2006 | Sampath et al. |
| 2006/0026344 A1 | 2/2006 | Sun Hsu et al. |
| 2006/0029289 A1 | 2/2006 | Yamaguchi et al. |
| 2006/0034164 A1 | 2/2006 | Ozluturk et al. |
| 2006/0034173 A1 | 2/2006 | Teague et al. |
| 2006/0039332 A1 | 2/2006 | Kotzin |
| 2006/0039344 A1 | 2/2006 | Khan |
| 2006/0039500 A1 | 2/2006 | Yun et al. |
| 2006/0040655 A1 | 2/2006 | Kim et al. |
| 2006/0045003 A1 | 3/2006 | Choi et al. |
| 2006/0050770 A1 | 3/2006 | Wallace et al. |
| 2006/0056340 A1 | 3/2006 | Hottinen et al. |
| 2006/0057958 A1 | 3/2006 | Ngo et al. |
| 2006/0067421 A1 | 3/2006 | Walton et al. |
| 2006/0078075 A1 | 4/2006 | Stamoulis et al. |
| 2006/0083159 A1 | 4/2006 | Laroia et al. |
| 2006/0083183 A1 | 4/2006 | Teague et al. |
| 2006/0089104 A1 | 4/2006 | Kaikkonen et al. |
| 2006/0092054 A1 | 5/2006 | Li et al. |
| 2006/0093065 A1 | 5/2006 | Thomas et al. |
| 2006/0104333 A1 | 5/2006 | Rainbolt et al. |
| 2006/0104381 A1 | 5/2006 | Menon et al. |
| 2006/0107171 A1 | 5/2006 | Skraparlis |
| 2006/0109814 A1 | 5/2006 | Kuzminskiy et al. |
| 2006/0111054 A1 | 5/2006 | Pan et al. |
| 2006/0114858 A1 | 6/2006 | Walton et al. |
| 2006/0120469 A1 | 6/2006 | Maltsev et al. |
| 2006/0120471 A1 | 6/2006 | Learned et al. |
| 2006/0126491 A1 | 6/2006 | Ro et al. |
| 2006/0133455 A1 | 6/2006 | Agrawal et al. |
| 2006/0133521 A1 | 6/2006 | Sampath et al. |
| 2006/0140289 A1 | 6/2006 | Mandyam et al. |
| 2006/0146867 A1 | 7/2006 | Lee et al. |
| 2006/0153239 A1 | 7/2006 | Julian et al. |
| 2006/0155534 A1 | 7/2006 | Lin et al. |
| 2006/0156199 A1 | 7/2006 | Palanki et al. |
| 2006/0172704 A1 | 8/2006 | Nishio et al. |
| 2006/0189321 A1 | 8/2006 | Oh et al. |
| 2006/0203708 A1 | 9/2006 | Sampath et al. |
| 2006/0203794 A1 | 9/2006 | Sampath et al. |
| 2006/0203891 A1 | 9/2006 | Sampath et al. |
| 2006/0203932 A1 | 9/2006 | Palanki et al. |
| 2006/0209670 A1 | 9/2006 | Gorokhov et al. |
| 2006/0209732 A1 | 9/2006 | Gorokhov et al. |
| 2006/0209754 A1 | 9/2006 | Ji et al. |
| 2006/0209764 A1 | 9/2006 | Kim et al. |
| 2006/0209973 A1 | 9/2006 | Gorokhov et al. |
| 2006/0215777 A1 | 9/2006 | Krishnamoorthi |
| 2006/0218459 A1 | 9/2006 | Hedberg |
| 2006/0223449 A1 | 10/2006 | Sampath et al. |
| 2006/0233124 A1 | 10/2006 | Palanki |
| 2006/0233222 A1 | 10/2006 | Reial et al. |
| 2006/0262754 A1 | 11/2006 | Andersson et al. |
| 2006/0270427 A1 | 11/2006 | Shida et al. |
| 2006/0274836 A1 | 12/2006 | Sampath et al. |
| 2006/0280114 A1 | 12/2006 | Osseiran et al. |
| 2006/0285485 A1 | 12/2006 | Agrawal et al. |
| 2006/0285515 A1 | 12/2006 | Julian et al. |
| 2006/0286974 A1 | 12/2006 | Gore et al. |
| 2006/0286982 A1 | 12/2006 | Prakash et al. |
| 2006/0286995 A1 | 12/2006 | Onggosanusi et al. |
| 2006/0291371 A1 | 12/2006 | Sutivong et al. |
| 2006/0292989 A1 | 12/2006 | Gerlach et al. |
| 2007/0004430 A1 | 1/2007 | Hyun et al. |
| 2007/0005749 A1 | 1/2007 | Sampath |
| 2007/0009011 A1 | 1/2007 | Coulsonn et al. |
| 2007/0019596 A1 | 1/2007 | Barriac et al. |
| 2007/0025345 A1 | 2/2007 | Bachl et al. |
| 2007/0041404 A1 | 2/2007 | Palanki et al. |
| 2007/0041457 A1 | 2/2007 | Kadous et al. |
| 2007/0047485 A1 | 3/2007 | Gorokhov et al. |
| 2007/0047495 A1 | 3/2007 | Ji et al. |
| 2007/0049218 A1 | 3/2007 | Gorokhov et al. |
| 2007/0053282 A1 | 3/2007 | Tong et al. |
| 2007/0053383 A1 | 3/2007 | Choi et al. |
| 2007/0060178 A1 | 3/2007 | Gorokhov et al. |
| 2007/0064669 A1 | 3/2007 | Classon et al. |
| 2007/0070952 A1 | 3/2007 | Yoon et al. |
| 2007/0071147 A1 | 3/2007 | Sampath et al. |
| 2007/0097853 A1 | 5/2007 | Khandekar et al. |
| 2007/0097889 A1 | 5/2007 | Wang et al. |
| 2007/0097897 A1 | 5/2007 | Teague et al. |
| 2007/0097908 A1 | 5/2007 | Khandekar et al. |
| 2007/0097909 A1 | 5/2007 | Khandekar et al. |
| 2007/0097910 A1 | 5/2007 | Ji et al. |
| 2007/0097922 A1 | 5/2007 | Parekh et al. |
| 2007/0097927 A1 | 5/2007 | Gorokhov et al. |
| 2007/0097942 A1 | 5/2007 | Gorokhov et al. |
| 2007/0097981 A1 | 5/2007 | Papasakellariou |
| 2007/0098050 A1 | 5/2007 | Khandekar et al. |
| 2007/0098120 A1 | 5/2007 | Wang et al. |
| 2007/0099666 A1 | 5/2007 | Astely et al. |
| 2007/0110172 A1 | 5/2007 | Faulkner et al. |
| 2007/0115795 A1 | 5/2007 | Gore et al. |
| 2007/0149194 A1 | 6/2007 | Das et al. |
| 2007/0149228 A1 | 6/2007 | Das |
| 2007/0159969 A1 | 7/2007 | Das et al. |
| 2007/0160115 A1 | 7/2007 | Palanki et al. |
| 2007/0165738 A1 | 7/2007 | Barriac et al. |
| 2007/0177631 A1 | 8/2007 | Popovic et al. |
| 2007/0177681 A1 | 8/2007 | Choi et al. |
| 2007/0183303 A1 | 8/2007 | Pi et al. |
| 2007/0183386 A1 | 8/2007 | Muharemovicc et al. |
| 2007/0207812 A1 | 9/2007 | Borran et al. |
| 2007/0211616 A1 | 9/2007 | Khandekar et al. |
| 2007/0211667 A1 | 9/2007 | Agrawal et al. |
| 2007/0230324 A1 | 10/2007 | Li et al. |
| 2007/0242653 A1 | 10/2007 | Yang et al. |
| 2007/0263743 A1 | 11/2007 | Lee et al. |
| 2007/0280336 A1 | 12/2007 | Zhangg et al. |
| 2007/0281702 A1 | 12/2007 | Lim et al. |
| 2008/0039129 A1 | 2/2008 | Li et al. |
| 2008/0063099 A1 | 3/2008 | Laroia et al. |
| 2008/0095223 A1 | 4/2008 | Tong et al. |
| 2008/0095262 A1 | 4/2008 | Hoo et al. |
| 2008/0151829 A1 | 6/2008 | Khandekar et al. |
| 2008/0181139 A1 | 7/2008 | Rangarajan et al. |
| 2008/0214222 A1 | 9/2008 | Atarashi et al. |
| 2008/0253279 A1 | 10/2008 | Ma et al. |
| 2008/0267157 A1 | 10/2008 | Lee et al. |
| 2008/0299983 A1 | 12/2008 | Kwak et al. |
| 2009/0003466 A1 | 1/2009 | Taherzadehboroujeni et al. |
| 2009/0010351 A1 | 1/2009 | Laroia et al. |
| 2009/0022098 A1 | 1/2009 | Novak et al. |
| 2009/0041150 A1 | 2/2009 | Tsai et al. |
| 2009/0110103 A1 | 4/2009 | Maltsev et al. |
| 2009/0129501 A1 | 5/2009 | Mehta et al. |
| 2009/0180459 A1 | 7/2009 | Orlikk et al. |
| 2009/0197646 A1 | 8/2009 | Tamura et al. |
| 2009/0201826 A1 | 8/2009 | Gorokhov et al. |
| 2009/0201872 A1 | 8/2009 | Gorokhov et al. |
| 2009/0213750 A1 | 8/2009 | Gorokhov et al. |
| 2009/0213950 A1 | 8/2009 | Gorokhov et al. |
| 2009/0262641 A1 | 10/2009 | Laroia et al. |
| 2009/0262699 A1 | 10/2009 | Wengerterr et al. |
| 2009/0285163 A1 | 11/2009 | Zhang et al. |
| 2009/0287977 A1 | 11/2009 | Chang et al. |
| 2010/0002570 A9 | 1/2010 | Walton et al. |
| 2010/0135242 A1 | 6/2010 | Nam et al. |
| 2010/0220800 A1 | 9/2010 | Erell et al. |
| 2010/0232384 A1 | 9/2010 | Farajidana et al. |
| 2010/0238902 A1 | 9/2010 | Ji et al. |
| 2010/0254263 A1 | 10/2010 | Chen et al. |
| 2011/0064070 A1 | 3/2011 | Gore et al. |

(56) References Cited

U.S. PATENT DOCUMENTS

| | | |
|---|---|---|
| 2011/0235733 A1 | 9/2011 | Laroia et al. |
| 2011/0235745 A1 | 9/2011 | Laroia et al. |
| 2011/0235746 A1 | 9/2011 | Laroia et al. |
| 2011/0235747 A1 | 9/2011 | Laroia et al. |
| 2011/0255518 A9 | 10/2011 | Agrawal et al. |
| 2011/0306291 A1 | 12/2011 | Ma et al. |
| 2012/0002623 A1 | 1/2012 | Khandekar et al. |
| 2012/0063441 A1 | 3/2012 | Palanki |
| 2012/0120925 A1 | 5/2012 | Kadous et al. |
| 2012/0140798 A1 | 6/2012 | Kadous et al. |
| 2012/0140838 A1 | 6/2012 | Kadous et al. |
| 2013/0016678 A1 | 1/2013 | Laroia et al. |
| 2013/0208681 A1 | 8/2013 | Gore et al. |
| 2013/0287138 A1 | 10/2013 | Ma et al. |
| 2013/0315200 A1 | 11/2013 | Gorokhov et al. |
| 2014/0247898 A1 | 9/2014 | Laroia et al. |
| 2014/0376518 A1 | 12/2014 | Palanki et al. |

FOREIGN PATENT DOCUMENTS

| | | |
|---|---|---|
| CA | 2477536 | 9/2003 |
| CA | 2540688 | 5/2005 |
| CA | 2577369 A1 | 3/2006 |
| CL | 19931400 | 12/1994 |
| CL | 1997846 | 1/1998 |
| CL | 009531997 | 1/1998 |
| CL | 1386344 | 12/2002 |
| CL | 1424835 | 6/2003 |
| CL | 27102004 | 8/2005 |
| CL | 22892004 | 9/2005 |
| CL | 30862004 | 10/2005 |
| CL | 29932005 | 5/2006 |
| CL | 15202006 | 12/2006 |
| CL | 22032006 | 2/2007 |
| CL | 15212006 | 3/2007 |
| CL | 14922006 | 4/2007 |
| CL | 14892006 | 5/2007 |
| CL | 14902006 | 5/2007 |
| CL | 29032006 | 5/2007 |
| CL | 29062006 | 5/2007 |
| CL | 29042006 | 6/2007 |
| CL | 29022006 | 7/2007 |
| CL | 29082006 | 10/2007 |
| CL | 46151 | 12/2009 |
| CL | 29012006 | 1/2010 |
| CL | 29072006 | 1/2010 |
| CN | 1252919 | 5/2000 |
| CN | 1267437 | 9/2000 |
| CN | 1284795 | 2/2001 |
| CN | 1296682 | 5/2001 |
| CN | 1344451 | 4/2002 |
| CN | 1346221 | 4/2002 |
| CN | 1383631 | 12/2002 |
| CN | 1402916 A | 3/2003 |
| CN | 1132474 C | 12/2003 |
| CN | 1467938 A | 1/2004 |
| CN | 1487755 A | 4/2004 |
| CN | 1520220 | 8/2004 |
| CN | 1525678 | 9/2004 |
| CN | 1636346 | 7/2005 |
| CN | 1642051 A | 7/2005 |
| CN | 1642335 A | 7/2005 |
| CN | 1647436 A | 7/2005 |
| DE | 19800653 A1 | 7/1999 |
| DE | 19800953 C1 | 7/1999 |
| DE | 19957288 C1 | 5/2001 |
| DE | 10240138 | 8/2003 |
| DE | 10254384 A1 | 6/2004 |
| EP | 0488976 A2 | 6/1992 |
| EP | 0568291 A2 | 11/1993 |
| EP | 0740431 A1 | 10/1996 |
| EP | 0786889 | 7/1997 |
| EP | 0805576 A2 | 11/1997 |
| EP | 0807989 A1 | 11/1997 |
| EP | 0844796 A2 | 5/1998 |
| EP | 0981222 | 2/2000 |
| EP | 1001570 A2 | 5/2000 |
| EP | 1047209 A1 | 10/2000 |
| EP | 1061687 A1 | 12/2000 |
| EP | 1091516 | 4/2001 |
| EP | 1093241 A1 | 4/2001 |
| EP | 1148673 | 10/2001 |
| EP | 1172983 A2 | 1/2002 |
| EP | 1180907 A2 | 2/2002 |
| EP | 1 187 506 | 3/2002 |
| EP | 1204217 A1 | 5/2002 |
| EP | 1255369 A1 | 11/2002 |
| EP | 1267513 A2 | 12/2002 |
| EP | 1074099 B1 | 2/2003 |
| EP | 1286490 A2 | 2/2003 |
| EP | 1335504 A2 | 8/2003 |
| EP | 1351538 A1 | 10/2003 |
| EP | 1376920 A1 | 1/2004 |
| EP | 1392073 A1 | 2/2004 |
| EP | 1434365 A2 | 6/2004 |
| EP | 1441469 A2 | 7/2004 |
| EP | 1445873 | 8/2004 |
| EP | 1465449 A1 | 10/2004 |
| EP | 1478204 A2 | 11/2004 |
| EP | 1507421 A1 | 2/2005 |
| EP | 1513356 | 3/2005 |
| EP | 1513356 A2 | 3/2005 |
| EP | 1531575 A2 | 5/2005 |
| EP | 1533950 A1 | 5/2005 |
| EP | 1536584 A1 | 6/2005 |
| EP | 1538863 A1 | 6/2005 |
| EP | 1542488 | 6/2005 |
| EP | 1601149 | 11/2005 |
| EP | 1643669 | 4/2006 |
| EP | 1898542 A1 | 3/2008 |
| EP | 1941693 | 7/2011 |
| FR | 2584884 A1 | 1/1987 |
| GB | 2279540 | 1/1995 |
| GB | 2279540 A | 1/1995 |
| GB | 2348776 A | 10/2000 |
| GB | 2412541 | 9/2005 |
| IL | 167573 | 2/2011 |
| IL | 201872 | 5/2012 |
| JP | H04111544 A | 4/1992 |
| JP | 04301931 A | 10/1992 |
| JP | H0746248 A | 2/1995 |
| JP | 7336323 | 12/1995 |
| JP | 8116329 A | 5/1996 |
| JP | 08288927 | 11/1996 |
| JP | 9008725 A | 1/1997 |
| JP | H09501548 A | 2/1997 |
| JP | 9131342 | 5/1997 |
| JP | 9182148 A | 7/1997 |
| JP | 09214404 | 8/1997 |
| JP | 9284200 A | 10/1997 |
| JP | 10117162 | 5/1998 |
| JP | H10210000 A | 8/1998 |
| JP | 10322304 A | 12/1998 |
| JP | H11168453 A | 6/1999 |
| JP | 11191756 A | 7/1999 |
| JP | 11196109 A | 7/1999 |
| JP | 11508417 T | 7/1999 |
| JP | 11239155 A | 8/1999 |
| JP | 11298954 A | 10/1999 |
| JP | 11331927 A | 11/1999 |
| JP | 2000022618 A | 1/2000 |
| JP | 2000102065 A | 4/2000 |
| JP | 2000184425 A | 6/2000 |
| JP | 2000511750 A | 9/2000 |
| JP | 2000-332724 | 11/2000 |
| JP | 2001016644 A2 | 1/2001 |
| JP | 2001045573 A | 2/2001 |
| JP | 2001057545 A | 2/2001 |
| JP | 2001156732 A | 6/2001 |
| JP | 2001238269 | 8/2001 |
| JP | 2001245355 A | 9/2001 |
| JP | 2001249802 A | 9/2001 |
| JP | 2001285927 A | 10/2001 |

(56) References Cited

FOREIGN PATENT DOCUMENTS

| | | |
|---|---|---|
| JP | 2001521698 A | 11/2001 |
| JP | 2001526012 T | 12/2001 |
| JP | 2002026790 A | 1/2002 |
| JP | 2002111556 A | 4/2002 |
| JP | 2002515203 T | 5/2002 |
| JP | 2002290148 A | 10/2002 |
| JP | 2002534925 A | 10/2002 |
| JP | 2002534941 | 10/2002 |
| JP | 2002538696 A | 11/2002 |
| JP | 200318054 | 1/2003 |
| JP | 2003032218 | 1/2003 |
| JP | 2003500909 | 1/2003 |
| JP | 200369472 | 3/2003 |
| JP | 2003101515 | 4/2003 |
| JP | 2003169367 A | 6/2003 |
| JP | 2003174426 | 6/2003 |
| JP | 2003199173 A | 7/2003 |
| JP | 2003520523 | 7/2003 |
| JP | 2003235072 A | 8/2003 |
| JP | 2003249907 A | 9/2003 |
| JP | 2003292667 A | 10/2003 |
| JP | 2003318857 A | 11/2003 |
| JP | 2003347985 A | 12/2003 |
| JP | 2003348047 | 12/2003 |
| JP | 2003536308 A | 12/2003 |
| JP | 2004007643 A | 1/2004 |
| JP | 2004023716 | 1/2004 |
| JP | 2004048716 | 2/2004 |
| JP | 200472457 | 3/2004 |
| JP | 2004072157 A | 3/2004 |
| JP | 2004096142 A | 3/2004 |
| JP | 2004507151 A | 3/2004 |
| JP | 2004507950 A | 3/2004 |
| JP | 2004153676 | 5/2004 |
| JP | 2004158901 A | 6/2004 |
| JP | 2004162388 A | 6/2004 |
| JP | 2004194262 A | 7/2004 |
| JP | 2004201296 A | 7/2004 |
| JP | 2004215022 A | 7/2004 |
| JP | 2004221972 | 8/2004 |
| JP | 2004266818 A | 9/2004 |
| JP | 2004529524 T | 9/2004 |
| JP | 2004297276 A | 10/2004 |
| JP | 2004297370 A | 10/2004 |
| JP | 2004297756 | 10/2004 |
| JP | 2004534456 | 11/2004 |
| JP | 2004535106 A | 11/2004 |
| JP | 2005-020530 | 1/2005 |
| JP | 2005006337 A | 1/2005 |
| JP | 2005502218 T | 1/2005 |
| JP | 2005506757 | 3/2005 |
| JP | 2005110130 A | 4/2005 |
| JP | 2005130491 A | 5/2005 |
| JP | 2005167502 A | 6/2005 |
| JP | 2005197772 | 7/2005 |
| JP | 2005203961 | 7/2005 |
| JP | 2005521327 T | 7/2005 |
| JP | 2005521358 | 7/2005 |
| JP | 2005236678 A | 9/2005 |
| JP | 2006505172 | 2/2006 |
| JP | 2006505230 A | 2/2006 |
| JP | 2006506860 A | 2/2006 |
| JP | 2006211537 A | 8/2006 |
| JP | 2006518173 A | 8/2006 |
| JP | 2006524930 A | 11/2006 |
| JP | 2007500486 A | 1/2007 |
| JP | 2007503790 | 2/2007 |
| JP | 2007519281 | 7/2007 |
| JP | 2007525043 T | 8/2007 |
| JP | 2007527127 | 9/2007 |
| JP | 2008505587 A | 2/2008 |
| JP | 2008535398 | 8/2008 |
| JP | 4188372 B2 | 11/2008 |
| JP | 2008546314 | 12/2008 |
| JP | 04694628 B2 | 6/2011 |
| KR | 0150275 B1 | 11/1998 |
| KR | 20000060428 | 10/2000 |
| KR | 100291476 B1 | 3/2001 |
| KR | 20010056333 | 4/2001 |
| KR | 20010087715 A | 9/2001 |
| KR | 20030007965 | 1/2003 |
| KR | 20030035969 A | 5/2003 |
| KR | 20040063057 | 7/2004 |
| KR | 200471652 | 8/2004 |
| KR | 20040103441 A | 12/2004 |
| KR | 20050061559 | 6/2005 |
| KR | 20050063826 A | 6/2005 |
| KR | 100606099 | 7/2006 |
| RU | 95121152 | 12/1997 |
| RU | 2141168 C1 | 11/1999 |
| RU | 2141706 C1 | 11/1999 |
| RU | 2159007 C2 | 11/2000 |
| RU | 2162275 C2 | 1/2001 |
| RU | 2183387 C2 | 6/2002 |
| RU | 2192094 C1 | 10/2002 |
| RU | 2197778 C2 | 1/2003 |
| RU | 2201033 C2 | 3/2003 |
| RU | 2207723 C1 | 6/2003 |
| RU | 2207723 C1 | 6/2003 |
| RU | 2208913 | 7/2003 |
| RU | 2210866 C2 | 8/2003 |
| RU | 2216101 C2 | 11/2003 |
| RU | 2216103 C2 | 11/2003 |
| RU | 2216105 | 11/2003 |
| RU | 2225080 | 2/2004 |
| RU | 2235432 C2 | 8/2004 |
| RU | 22235429 | 8/2004 |
| RU | 2237379 C2 | 9/2004 |
| RU | 22238611 C1 | 10/2004 |
| RU | 2242091D2 | 12/2004 |
| RU | 2003125268 | 2/2005 |
| RU | 2285388 | 3/2005 |
| RU | 2250564 | 4/2005 |
| RU | 2257008 | 7/2005 |
| RU | 2267224 | 12/2005 |
| RU | 2005129079 | 2/2006 |
| RU | 2285338 C2 | 10/2006 |
| RU | 2285351 C2 | 10/2006 |
| RU | 2292655 | 1/2007 |
| RU | 2335864 C2 | 10/2008 |
| RU | 2349043 C2 | 3/2009 |
| SU | 1320883 | 6/1987 |
| TW | 508960 | 11/2002 |
| TW | 510132 | 11/2002 |
| TW | 200302642 | 8/2003 |
| TW | 200401572 | 1/2004 |
| TW | I232040 | 5/2005 |
| TW | 1248266 | 1/2006 |
| TW | 200718128 | 5/2007 |
| WO | WO2004004370 | 1/1920 |
| WO | WO9408432 A1 | 4/1994 |
| WO | 9521494 | 8/1995 |
| WO | WO-9613920 A1 | 5/1996 |
| WO | WO9701256 | 1/1997 |
| WO | WO9737456 A1 | 10/1997 |
| WO | WO-9746033 A2 | 12/1997 |
| WO | 9800946 | 1/1998 |
| WO | WO-9814026 A1 | 4/1998 |
| WO | WO9837706 A2 | 8/1998 |
| WO | WO9848581 A1 | 10/1998 |
| WO | WO9853561 | 11/1998 |
| WO | WO9854919 A2 | 12/1998 |
| WO | 9941871 | 8/1999 |
| WO | WO-9944313 A1 | 9/1999 |
| WO | WO-9944383 A1 | 9/1999 |
| WO | 9952250 | 10/1999 |
| WO | WO9953713 A2 | 10/1999 |
| WO | 9960729 | 11/1999 |
| WO | WO-9959265 A1 | 11/1999 |
| WO | WO9960729 A1 | 11/1999 |
| WO | 0004728 | 1/2000 |
| WO | WO0002397 | 1/2000 |
| WO | WO0033503 A1 | 6/2000 |
| WO | WO-0033848 A1 | 6/2000 |

(56) References Cited

FOREIGN PATENT DOCUMENTS

| | | |
|---|---|---|
| WO | 0051389 A1 | 8/2000 |
| WO | WO0070897 | 11/2000 |
| WO | WO0101596 | 1/2001 |
| WO | WO0117125 A1 | 3/2001 |
| WO | WO0126269 A1 | 4/2001 |
| WO | WO-0139523 A2 | 5/2001 |
| WO | WO0145300 | 6/2001 |
| WO | WO-0148969 A2 | 7/2001 |
| WO | WO-0158054 A1 | 8/2001 |
| WO | WO-0160106 A1 | 8/2001 |
| WO | 0165637 A2 | 9/2001 |
| WO | WO0169814 A1 | 9/2001 |
| WO | WO0182543 A2 | 11/2001 |
| WO | WO-0182544 A2 | 11/2001 |
| WO | WO-0189112 A1 | 11/2001 |
| WO | 0195427 A2 | 12/2001 |
| WO | WO0193505 | 12/2001 |
| WO | 0204936 | 1/2002 |
| WO | WO0207375 A1 | 1/2002 |
| WO | 0215432 A1 | 2/2002 |
| WO | WO0215616 A2 | 2/2002 |
| WO | WO-0219746 A1 | 3/2002 |
| WO | 0231991 | 4/2002 |
| WO | 0233848 | 4/2002 |
| WO | 0245293 A2 | 6/2002 |
| WO | WO0245456 A1 | 6/2002 |
| WO | WO0249305 | 6/2002 |
| WO | WO-0249306 A2 | 6/2002 |
| WO | WO0249385 A2 | 6/2002 |
| WO | WO02060138 A2 | 8/2002 |
| WO | WO02065675 | 8/2002 |
| WO | WO02082689 A2 | 10/2002 |
| WO | WO-02082743 A2 | 10/2002 |
| WO | WO0293819 | 11/2002 |
| WO | WO02089434 A1 | 11/2002 |
| WO | WO02093782 A1 | 11/2002 |
| WO | WO02100027 A1 | 12/2002 |
| WO | 03001981 | 1/2003 |
| WO | 03007965 | 1/2003 |
| WO | WO-03001696 A2 | 1/2003 |
| WO | WO03001696 A2 | 1/2003 |
| WO | WO03001761 A1 | 1/2003 |
| WO | WO-03003617 A2 | 1/2003 |
| WO | WO03019819 | 3/2003 |
| WO | WO03030414 A1 | 4/2003 |
| WO | WO03034644 A1 | 4/2003 |
| WO | WO03043262 A1 | 5/2003 |
| WO | WO03043369 | 5/2003 |
| WO | 03049409 A2 | 6/2003 |
| WO | 03058871 | 7/2003 |
| WO | WO03058871 A1 | 7/2003 |
| WO | 03069816 A2 | 8/2003 |
| WO | WO03067783 | 8/2003 |
| WO | WO03069832 A1 | 8/2003 |
| WO | WO03073646 | 9/2003 |
| WO | WO03075479 A1 | 9/2003 |
| WO | WO03085876 | 10/2003 |
| WO | WO03088538 A1 | 10/2003 |
| WO | WO03094384 | 11/2003 |
| WO | 2004002011 A1 | 12/2003 |
| WO | WO03103331 | 12/2003 |
| WO | WO2004002047 A1 | 12/2003 |
| WO | 2004008681 | 1/2004 |
| WO | WO2004008671 A1 | 1/2004 |
| WO | WO2004015912 | 2/2004 |
| WO | WO2004016007 | 2/2004 |
| WO | WO2004021605 A1 | 3/2004 |
| WO | WO2004023834 A1 | 3/2004 |
| WO | 2004028037 A1 | 4/2004 |
| WO | 2004032443 | 4/2004 |
| WO | WO 2004/030238 | 4/2004 |
| WO | 2004038972 | 5/2004 |
| WO | 2004038984 A2 | 5/2004 |
| WO | 2004040825 | 5/2004 |
| WO | WO2004038954 | 5/2004 |
| WO | WO-2004038988 A2 | 5/2004 |
| WO | WO-2004040690 A2 | 5/2004 |
| WO | WO-2004040827 A2 | 5/2004 |
| WO | WO 2004/051872 | 6/2004 |
| WO | WO2004047354 A1 | 6/2004 |
| WO | WO2004049618 A1 | 6/2004 |
| WO | 2004056022 A2 | 7/2004 |
| WO | WO2004062255 | 7/2004 |
| WO | WO2004064294 | 7/2004 |
| WO | WO2004064295 | 7/2004 |
| WO | WO2004066520 | 8/2004 |
| WO | WO2004068721 A2 | 8/2004 |
| WO | WO2004075023 | 9/2004 |
| WO | WO2004075442 | 9/2004 |
| WO | WO2004075448 | 9/2004 |
| WO | WO2004075468 | 9/2004 |
| WO | WO2004075596 | 9/2004 |
| WO | WO2004077850 A2 | 9/2004 |
| WO | WO2004084509 | 9/2004 |
| WO | WO-2004086706 A1 | 10/2004 |
| WO | WO-2004086711 A1 | 10/2004 |
| WO | WO2004095730 A1 | 11/2004 |
| WO | WO-2004095851 A2 | 11/2004 |
| WO | WO2004095854 | 11/2004 |
| WO | WO-2004098072 A1 | 11/2004 |
| WO | WO2004098222 | 11/2004 |
| WO | WO2004102815 | 11/2004 |
| WO | WO2004102816 A2 | 11/2004 |
| WO | 2004114564 A1 | 12/2004 |
| WO | 2004114615 A1 | 12/2004 |
| WO | WO2004105272 A1 | 12/2004 |
| WO | WO2004114549 | 12/2004 |
| WO | 2005002253 | 1/2005 |
| WO | WO2005002253 A1 | 1/2005 |
| WO | WO-2005005527 A1 | 1/2005 |
| WO | 2005015797 | 2/2005 |
| WO | 2005018270 | 2/2005 |
| WO | WO2005011163 A1 | 2/2005 |
| WO | WO-2005015795 A1 | 2/2005 |
| WO | WO2005015810 | 2/2005 |
| WO | WO-2005015941 A2 | 2/2005 |
| WO | WO2005020488 A1 | 3/2005 |
| WO | WO2005020490 | 3/2005 |
| WO | WO2005022811 | 3/2005 |
| WO | WO2005025110 A2 | 3/2005 |
| WO | WO2005032004 A1 | 4/2005 |
| WO | 2005043780 A1 | 5/2005 |
| WO | WO2005043855 | 5/2005 |
| WO | WO2005046080 A1 | 5/2005 |
| WO | 2005055465 A1 | 6/2005 |
| WO | WO2005055484 A1 | 6/2005 |
| WO | WO-2005055527 A1 | 6/2005 |
| WO | WO2005060192 A1 | 6/2005 |
| WO | WO-2005065062 A2 | 7/2005 |
| WO | WO-2005069538 A1 | 7/2005 |
| WO | WO-2005096538 A1 | 7/2005 |
| WO | WO2005074184 | 8/2005 |
| WO | 2005086440 A1 | 9/2005 |
| WO | WO2005122628 | 12/2005 |
| WO | 2006007292 A2 | 1/2006 |
| WO | WO2006019710 | 2/2006 |
| WO | WO-2006026344 A1 | 3/2006 |
| WO | WO2006044487 | 4/2006 |
| WO | 2006062356 A1 | 6/2006 |
| WO | 2006069301 | 6/2006 |
| WO | WO2006069300 | 6/2006 |
| WO | WO2006069397 | 6/2006 |
| WO | WO2006077696 | 7/2006 |
| WO | 2004073276 | 8/2006 |
| WO | 2006099545 | 9/2006 |
| WO | 2006099577 | 9/2006 |
| WO | WO-2006096784 A1 | 9/2006 |
| WO | WO-2006099349 A1 | 9/2006 |
| WO | 2006127544 | 11/2006 |
| WO | WO-2006134032 A1 | 12/2006 |
| WO | WO-2006138196 A1 | 12/2006 |
| WO | WO-2006138573 A2 | 12/2006 |
| WO | WO2006138581 A2 | 12/2006 |
| WO | 2007022430 A2 | 2/2007 |

(56) References Cited

FOREIGN PATENT DOCUMENTS

| WO | 2007024935 | 3/2007 |
|---|---|---|
| WO | WO-2007024934 | 3/2007 |
| WO | WO2007025160 | 3/2007 |
| WO | WO-2007051159 A2 | 5/2007 |

OTHER PUBLICATIONS

Fuchs, et al., "A Novel Tree-Based Scheduling Algorithm for the Downlink of Multi-User MIMO Systems with ZF Beamforming," IEEE International Conference on Acoustics, Speech, and Signal Processing, 2005, Proceedings, Philadelphia, PA, pp. 1121-1124.

Schnell, et al., "A Promising New Wideband Multiple-Access Scheme for Future Mobile Communications Systems," European Transactions on Telecommunications, Wiley & Sons, Chichester, GB, vol. 10, No. 4, Jul. 1999, pp. 417-427.

International Search Report—PCT/US06/014878, International Search Authority—European Patent Office, Aug. 25, 2006.

Written Opinion—PCT/US06/014878, International Search Authority—European Patent Office, Aug. 25, 2006.

International Preliminary Report on Patentability—PCT/US06/014878, The International Bureau of WIPO—Geneva, Switzerland, Oct. 23, 2007.

3rd Generation Partnership Project; Technical Specification Group Radio Access Network; Physical Layer Aspects for Evolved UTRA (Release 7), 3GPP TR 25.814 v0.3.1 (Nov. 2005).

Bahai, Saltzberg, "System Architecture," Multi-Carrier Digital Communications, Kluwer Academic, New York, NY, XP-002199501, 1999, pp. 17-21.

Bingham, "Other Types of MCM," ADSL, VDSL, and Multicarrier Modulation, John Wiley & Sons, New York, XP-002199502. 2000, pp. 111-113.

Chennakeshu, et al. "A Comparision of Diversity Schemes for a Mixed-Mode Slow Frequency-Hopped Cellular System," IEEE, 1993, pp. 1749-1753.

Chennakeshu, et al. "Capacity Analysis of a TDMA-Based Slow-Frequency-Hopped Cellular System," IEEE Transaction on Vehicular Technology, vol. 45., No. 3 Aug. 1996, pp. 531-542.

Chiani, et al. "Outage Evaluation for Slow Frequency-Hopping Mobile Radio Systems" IEEE Transactions on Communications, vol. 47, No. 12, pp. 1865-1874, Dec. 1999.

Choi, et al., "Design of the Optimum Pilot Pattern for Channel Estimation in OFDM Systems," Global Telecommunications Conference, IEEE Communications Society, pp. 3661-3665, Globecom, Dallas, Texas (2004).

Czylwik, "Comparison Between Adaptive OFDM and Single Carrier Modulation with Frequency Domain Equalization," IEEE 47th Vehicular Technology Conference, vol. 2, May 4-7, 1997, pp. 865-869.

Das, et al. "On the Reverse Link Interference Structure for Next Generation Cellular Systems," European Microwave Conference, Oct. 11, 2004, pp. 3068-3072.

Hill, et al., "Cyclic Shifting and Time Inversion of Partial Transmit Sequences to Reduce the Peak-to-Average Power Ratio in OFDM," IEEE International Symposium on Personal, Indoor and Mobile Radio Communications, vol. 2, Sep. 18, 2000, Piscataway, NJ, pp. 1256-1259.

Je, et al. "A Novel Multiple Access Scheme for Uplink Cellular Systems," IEEE Vehicular Technology Conference, Sep. 26, 2004 pp. 984-988.

Kaleh, "Channel Equalization for Block Transmission Systems," IEEE Journal on Selected Areas in Communications, vol. 13, No. 1, Jan. 1995, pp. 110-121.

Kappes, J.M., and Sayegh, S.I., "Programmable Demultiplexer/Demodulator Processor," COMSAT Laboratories, IEEE, 1990, pp. 230-234.

Keller, et al., "Adaptive Multicarrier Modulation: A Convenient Framework for Time-Frequency Processing in Wireless Communications," Proceedings of the IEEE, vol. 88, No. 5, May 2000, pp. 611-640.

Kim, et al. "Performance of TDMA System With SFH and 2-Bit Differentially Detected GMSK Over Rayleigh Fading Channel," IEEE Vehicular Technology Conference, Apr. 28, 1996, pp. 789-793.

Kishiyama Y et al: "Investigation of Optimum Pilot Channel Structure for VSF-OFCDM Broadband Wireless Access in Forward Link", IEEE Vehicular Technology Conference, New York, NY, US, vol. 4, pp. 139-144, Apr. 22, 2003.

Kostic, et al. "Dynamic Frequency Hopping in Wireless Cellular Systems-Simulations of Full-Replacement and Reduced-Overhead Methods," IEEE Vehicular Technology Conference, May 16, 1999, pp. 914-918.

Kostic, et al. "Fundamentals of Dynamic Frequency Hopping in Cellular Systems," IEEE Journal on Selected Areas in Communications, vol. 19, No. 11, Nov. 2001 pp. 2254-2266.

LaCroix, et al., "A Study of OFDM Parameters for High Data Rate Radio LAN's," 2000 IEEE 51st Vehicular Technology Conference Proceedings, vol. 2, May 15-18, 2000, pp. 1075-1079.

Leon, et al., "Cyclic Delay Diversity for Single Carrier-Cyclic Prefix Systems," Conference Record of the Thirty-Ninth Asilomar Conference on Signals, Systems and Computers, Oct. 28, 2005, Piscataway, NJ, pp. 519-523.

Lott, "Comparison of Frequency and Time Domain Differential Modulation in an OFDM System for Wireless ATM," 1999 IEEE 49th Vehicular Technology Conference, vol. 2, Jul. 1999, pp. 877-883.

Mignone, et al., "CD3-OFDM: A New Channel Estimation Method to Improve the Spectrum Efficiency in Digital Terrestrial Television Systems," International Broadcasting Convention, Sep. 14-18, 1995 Conference Publication No. 413, IEE 1995, pp. 122-128.

Naofal Al-Dhahir: "A Bandwidth-Optimized Reduced-Complexity Equalized Multicarrier Transceiver", IEEE Transactions on Communications, vol. 45, No. 8, Aug. 1997.

Naofal Al-Dhahir: "Optimum Finite-Length Equalization for Multicarrier Transceivers", IEEE Trans. On Comm., pp. 56-64, Jan. 1996.

Nassar, Carl R., et al., "High-Performance MC-CDMA via Carrier Interferometry Codes", IEEE Transactions on Vehicular Technology, vol. 50, No. 6, Nov. 2001.

Nassar, Carl R., et al., Introduction of Carrier Interference to Spread Spectrum Multiple Access, Apr. 1999, IEEE, pp. 1-5.

NTT DoCoMo, et al.: "Orthogonal Common Pilot Channel and Scrambling Code in Evolved UTRA Downlink," 3GPP TSG RAN WG1 #42 on LTE, pp. 1-8 (Aug.-Sep. 2005).

Sari, et al., "Transmission Techniques for Digital Terrestrial TV Broadcasting," IEEE Communications Magazine, Feb. 1995, pp. 100-109.

Schnell, et al, "Application of IFDMA to Mobile Radio Transmission," IEEE 1998 International Conference on Universal Personal Communications, vol. 2, Oct. 5-9, 1998, pp. 1267-1272.

Shattil et al., "Array Control Systems for Multicarrier Protocols Using a Frequency-Shifted Feedback Cavity", IEEE, 1999.

Sklar: "Formatting and Baseband Transmission", Chapter 2, pp. 54, 104-106.

Sklar: "The process of thus correcting the channel-induced distortion is called equalization", Digital Communications, PTR Prentice Hall, Upper Saddle River, New Jersey, 1998, Formatting and Baseband Transmission, Chap. 2, Section 2.11.2, pp. 104-105.

Sorger U et al.: "Interleave FDMA-A New Spread-Spectrum Multiple-Access Scheme",Communications, Conference Record, IEEE, Atlanta, GA, Jun. 1998, pp. 1013-1017, XP010284733.

Tellado, "Multicarrier Modulation with Low Par," Kluwer Academic, Dordrecht, NL, XP-002199500, 2000, pp. 6-11 and 55-60.

Tellambura, "Use of m-sequences for OFDM Peak-to-Average Power Ratio Reduction," Electronics Letters, vol. 33, No. 15, Jul. 17, 1997, pp. 1300-1301.

Torrieri, "Cellular Frequency-Hopping CDMA Systems," IEEE Vehicular Technology Conference, May 16, 1999, pp. 919-925.

Xiaodong, et al., "M-Sequences for OFDM Peak-to-Average Power Ratio Reduction and Error Correction," Electronics Letters, vol. 33, Issue 7, Mar. 27, 1997, pp. 554-555.

Zekri, et al., "DMT Signals with Low Peak-to-Average Power Ratio," Proceedings, IEEE International Symposium on Computers and Communications, 1999, Jul. 6-8, 1999, pp. 362-368.

(56) References Cited

OTHER PUBLICATIONS

Wang, et al., "Improving performance of multi-user OFDM systems using bit-wise interleaver" Electronics Letters, IEE Stevenage, GB, vol. 37, No. 19, Sep. 13, 2001. pp. 1173-1174. XP006017222.
Yun, et al., "Perforrnanbe of an LDPC-Cooled Frequency-Hopping OFDMA System Based on Resource Allocation in the Uplink" Vehicular Technology Conference, 2004. VTC 2004-Spring. 2004 IEEE 59th Milan, Italy, May 17-19, 2004, Piscataway, NJ, USA, vol. 4, May 17, 2004, pp. 1925-1928, XP010766497.
Wang at al., "Improving performance of multi-user OFDM Systems using bit-wise interleaver" Electronics Letters IEE Stevenage, GB, vol. 37. No. 19, Sep. 13, 2001, pp. 1173-1174 XP006017222.
Yun et al., "Performance of an LDPC-Coded Frequency-Hopping QFDMA System Based on Resource Allocation in the Uplink" Vehicular Technology-Conference 2004. VTO 2004-Spring, 2004 IEEE 59th Milan, Italy May 17-19, 2004, Piscataway, NJ, USA, vol. 4, May 17, 2004. pp. 1925-1928. XP010766497.
Digital cellular telecommunications system (Phase 2+); Mobile radio interface layer 3 specification (GSM 04.08 version 7.7.1 Release 1998); ETSI EN 300 940 V7.7.1 (Oct. 2000), pp. 1,2,91-93.
3GPP TS 33.220 V.1.1.0 XX.XX, "3rd Generation Partnership Projects; Technical Specification Group Services And System Aspects; Generic Authentication Architecture (Gaa); Generic Bootstrapping Architecture (Release 6)" Feb. 9, 2004, pp. 1-17, figure 4, XP002996023.
Das, Arnab, et al. "Adaptive, asynchronous incremental redundancy (A-IR) with fixed transmission time intervals TTI for HSDPA." IEEE, pp. 10-83-1087.
Favre et al: "Self-Adaptive Transmission Procedure" IBM Technical Disclosure Bulletin, IBM Corporation, Sep. 1976, vol. 19, No. 4, pp. 1283-1284, New York, New York.
Groe, et al., "CDMA Mobile Radio Design," Sep. 26, 2001, Artech House, Norwood, MA 02062, pp. 257-259.
Hermann Rohling et al.,: "Performance Comparison Of Different Multiple Access Schemes For the Downlink of an OFDM Communication System", Vehicular Technology Conference, 1997, 47th IEEE, vol. 3, May 4-7, 1997, pp. 1365-1369.
J.S. Chow and J.M. Cioffi: "A cost-effective maximum likelihood receiver for multicarrier systems", Proc. IEEE Int. Conf. On Comm., pp. 948-952, Jun. 1992.
John B. Groe, Lawrence E. Larson, "CDMA Mobile Radio Design" Sep. 26, 2001, Artech House, Norwood, MA02062 580530, XP002397967, pp. 157-159.
Karsten Bruninghaus et al.,: "Multi-Carrier Spread Spectrum and It'relationship to Single-Carrier Transmission", Vehicular technology Conference, 1998, VTC 98, 48th IEEE, vol. 3, May 18-21, 1998, pp. 2329-2332.
Laroia, R. et al: "An integrated approach based on cross-layer optimization—Designing a mobile broadband wireless access network" IEEE Signal Processing Magazine, IEEE Service Center Piscataway, NJ, US, vol. 21, No. 5, Sep. 2004, pp. 20-28, XP011118149.
Lau, et al., "On the Design of MIMO Block-Fading Channels with Feedback-Link Capacity Constraint," IEEE Transactions on Communications, IEEE Service Center, Piscataway, NJ, US, vol. 52, No. 1, Jan 2004, pp. 62-70, XP001189908.
Lettieri et al. "Adaptive frame length control for improving wireless link throughput, range, and energy efficiency", INFOCOM 98, 17th Annual Joint Conference of the IEEE Computer and Communications Societies, Mar. 29-Apr. 2, 1998, pp. 564-571, vol. 2, IEEE San Francisco, CA, New York, New York.
Molisch, et al., MIMO systems with antenna selection, IEEE Microwave Magazine, URL: http://ieeexplore.ieee.org/ieee.org/iel5/6668/28677/01284943.pdf, Retrieved on Dec. 8, 2006, pp. 46-56 (2004).
Net Working Group, T. Dierks, C Allen, CERTICOM; The TLS Protocol Version 1.0; Jan. 1999.
Shattil, Steven, Multiple Access Method and system, Aug. 1999, PCT, pp. 1-25.
TIA/EIA/IS-2000 "Standards For CDMA2000 Spread Spectrum Systems" Version 1.0 Jul. 1999.
TIA/EIA/IS-95 "Mobile Station-Base Station Compatibility Standard For Dual-Mode Wideband Spread Spectrum Cellular System" Jul. 1993.
TIA-1121.001 "Physical Layer for Ultra Mobile Broadband (UMB) Air Interface Specification," 3GPP2 C.S0084-001-0, Version 2.0 (Aug. 2007).
TIA-1121.002 "Medium Access Control Layer for Ultra Mobile Broadband (UMB) Air Interface Specification," 3GPP2 C.S0084-002-0, Version 2.0 (Aug. 2007).
Tomcik, J.: "MBFDD and MBTDD Wideband Mode: Technology Overview," IEEE 802.20 Working Group Mobile Broadband Wireless Access, Jan. 2006, pp. 1-109, XP002429968.
Tomcik, J., "QFDD Technology Overview Presentation,". IEEE 802.20 Working Group on Mobile Broadband Wireless Access, Slides/pp. 1-73, Nov. 15, 2005 and Oct. 28, 2005.
Toufik I et al., "Channel allocation algorithms for multi-carrier systems", Vehicular Technology Conference, 2004. VTC2004-FALL. 2004 IEEE 60th Los Angeles, CA, USA Sep. 26-29, 2004, pp. 1129-1133, XP010786798. ISBN: 07-7803-8521-7.
S. Nishimura et al., "Downlink Null-Formation Using Receiving Antenna Selection in MIMO/SDMA", Technical Search Report of Electric Information Communication Academic Conference, February 28, 2002, vol. 101, No. 683, pp. 17-22, RCS 2001-286.
Blum et al, "On Optimum MIMO with antenna selection," IEEE International Conference on Communications; Conference Proceedings, vol. 1, Apr. 28, 2002, pp. 386-390.
Catreux, S. et al.: "Simulation results for an interference-limited multiple input multiple output cellular system"., Global Telecommunications Conference, 2000. GLOBECOM '00. IEEE. Dec. 1, 2000. vol. 2, pp. 1094-1096 http://ieeexplore.ieee.org/iel5/7153/19260/00891306.pdf?tp=& isnumber=19260&arnumber =8913063 &punumber=7153.
Chiani, et al. "Outage Evaluation for Slow Frequency-Hopping Mobile Radio Systems" IEEE Transactions on Communications, vol. 47, No. 12, Dec. 1999, pp. 1865-1874,. Note: no dated, month and year only.
Chung, S. et al.: "Low complexity algorithm for rate and power quantization in extended V-BLAST" VTC Fall 2001, IEEE 54th. Vehicular Technology Conference Proceedings. Alantic City, NJ, Oct. 7-11, 2001, vol. 1 of 4, pp. 910-914, Conf. 54.
El Gamal, et al.: "Universal Space-Time Coding," IEEE Transactions on Information Theory, vol. 49, Issue 5, pp. 1097-1119, XP011074756, ISSN: 0018-9448, May 2003.
Hochwald et al., "Achieving near-capacity on a multiple-antenna channel," IEEE Transactions on Communications, IEEE Service Center, Piscataway, New Jersey, vol. 51, No. 3, pp. 389-399 (2003).
Kiessling et al, "Short-term and long-term diagonalization of correlated MIMO channels with adaptive modulation" IEEE International Symposium on Personal, Indoor and Mobile Radio Communications, vol. 2, Sep. 15, 2002, pp. 593-597.
Kousa, M. et al: "Adaptive Binary Coding For Diversity Communication Systems" IEEE International Conference on Personal Wireless Communications Proceedings, pp. 80-84, XP000992269, 1997.
Nokia, "Uplink Considerations for UTRA LTE", 3GPP TSG RAN WG1#40bis, Beijing, CN, R1-050251, 3GPP, Apr. 4, 2005, pp. 1-9.
NTT DoCoMo, "Downlink Multiple Access Scheme for Evolved UTRA", 3GPP R1-050249, 3GPP, Apr. 4, 2005, pp. 1-8.
Prasad, N. et al.: "Analysis of Decision Feedback Detection for MIMO Rayleigh Fading Channels and Optimum Allocation of Transmitter Powers and QAM Constellations," pp. 1-10, 39th Annual Conference on Comm. Control and Comput., Monticello, IL Oct. 2001.
Qualcomm Europe: "Description and link simulations for OFDMA based E-UTRA uplink" 3GPP Draft; R1-051100, 3rd Generation Partnership Project (3GPP), Mobile Competence Centre; 650, Route Des Lucioles; F-06921 Sophia-Antipolis Cedex; France, vol. RAN WG1, No. San Diego, USA; 20051004, Oct. 4, 2005, pp. 1-10, XP050100715.
Schnell at al., "Application of IFDMA to Mobile Radio Transmission", IEEE 1998 International Conference on Universal Personal Communications, vol. 2, Oct 5-9, 1998, pp. 1267-1272.

(56) References Cited

OTHER PUBLICATIONS

Widdup, B. at al., "A highly-parallel VLSI architecture for a list sphere detector," IEEE International Conference, Paris, France, vol. 5, pp. 2720-2725 (2004).
Wiesel, A. et al.: "Efficient implementation of sphere demodulation" Signal Processing Advances in Wireless Communications, 2003. SPAWC 2003. 4th IEEE Workshop on Rome. Italy Jun. 15-18, 2003, Piscataway, NJ, USA, IEEE, US, Jun. 15, 2003, pp. 36-40, XP010713463.
European Search Report—EP10011743, Search Authority—Munich Patent Office, Dec. 20, 2010.
European Search Report—EP10012081, Search Authority—Munich Patent Office, Dec. 17, 2010.
European Search Report—EP10012082, Search Authority—Munich Patent Office, Dec. 20, 2010.
European Search Report—EP10012083, Search Authority—Munich Patent Office, Dec. 30, 2010.
Guo, K. Et al.: "Providing end-to-end QoS for multimedia applications in 3G wireless networks," Proceedings vol. 5242, SPIE ITCom 2003 Conf. Internet Multimedia Management Systems IV, Nov. 26, 2003, pp. 1-14, DOI: 10.1117/12.514061.
Maniatis, I. et al., "Pilots for joint channel estimation in multi-user OFDM mobile radio systems," 2002 IEEE Seventh International Symposium on Spread Spectrum Techniques and Applications, Prague, Czech Republic, Sep. 2, 2002, pp. 44-48, XP010615562.
Sumii, Kenji et al.: "A Study on Computational Complexity Reduction of Iterative Decoding for Turbo-coded MIMO-SDM Using Sphere Decoding," Technical Report ref IEICE, RCS, Nov. 9, 2010, vol. 104, No. 675, pp. 43-48.
Taiwanese Search Report—095139893—TIPO—Dec. 30, 2010.
Tomcik, T.: "QTDD Performance Report 2," IEEE 0802.20-05/88, IEEE 802.20 Working Group on Mobile Broadband Wireless Access, <http://ieee802.org/20/>, pp. 1-56, XP002386798 (Nov. 15, 2005).
Translation of Office Action in Chinese Application 2006800295980 corresponding to U.S. Appl. No. 11/260,895, citing CN1346221 and CN1383631 dated Feb. 16, 2011.
Translation of Office Action in Japan application 2008-538193 corresponding to U.S. Appl. No. 11/261,065, citing JP11196109, JP10322304 and JP9008725 dated Mar. 8, 2011.
Translation of Office Action in Korean application 10-2007-7031029 corresponding to U.S. Appl. No. 11/260,931, citing US20030202491 and KR20040063057 dated Jan. 28, 2011.
Translation of Office Action in Canadian application 2625987 corresponding to U.S. Appl. 11/261,065, citing CA2577369 dated Apr. 12, 2011.
Translation of Office Action in Chinese application 200680040236.1 corresponding to U.S. Appl. No. 11/261,065, citing US20040048609 and CN1402916 dated Feb. 18, 2011.
Translation of Office Action in Chinese application 200680048832.4 corresponding to U.S. Appl. No. 11/261,158, citing CN1132474 dated Dec. 31, 2010.
Translation of Office Action in Japanese Application 2008-514880 corresponding to U.S. Appl. No. 11/445,377, citing JP2007519281 and JP2006505172 dated Nov. 9, 2010.
Translation of Office Action in Japanese application 2008-528103 corresponding to U.S. Appl. No. 11/260,924, citing JP2005502218, JP2004534456, JP2003348047, JP2003199173, JP2004529524, JP11508417, JP2001238269, JP2005130491 and JP2003500909 dated Feb. 8, 2011.
Translation of Office Action in Japanese Application 2008-529216 corresponding to U.S. Appl. No. 11/261,159, citing GB2348776, WO2004098222, WO2005065062 and WO2004102815.Dated Jan. 11, 2011.
Translation of Office Action in Japanese application 2008-538181 corresponding to U.S. Appl. No. 11/511,735, citing WO2004064295, JP2002515203, JP8288927, JP7336323 and JP200157545 dated Jan. 25, 2011.

Yongmei Dai; Sumei Sun; Zhongding Lei; Yuan Li,: "A List Sphere Decoder based turbo receiver for groupwise space time trellis coded (GSTTC) systems," 2004 IEEE 59th Vehicular Technology Conference, vol. 2, pp. 804-808, May 17, 2004, doi: 10.1109/VETECS. 2004.1388940.
B. Sklar: "The process of thus correcting the channel-induced distortion is called equalization", Digital Communications, PTR Prentice Hall, Upper Saddle River, New Jersey, 1998, Formatting and Baseband Transmission, Chap. 2, Section 2.11.2, pp. 104-106.
Taiwan Search Report—TW095129021—TIPO—May 24, 2011.
Voltz, P. J.,"Characterization of the optimum transmitter correlation matrix for MIMO with antenna subset selection", IEEE Transactions on Communications, vol. 51, No. 11, pp. 1779-1782, (Nov. 1, 2003).
Alcatel-Lucent, et al., "Dedicated Reference Signals for Precoding in E-UTRA Downlink" 3GPP Draft; R1-071718, 3rd Generation Partnership Project (3GPP), Mobile Competence Centre; 650, Route Des Lucioles; F-06921 Sophia-Antipolis Cedex; France, vol. RAN WG1, No. St. Julian; Apr. 3, 2007, XP050105640 [retrieved on Apr. 3, 2007].
Bengtsson, M. et at, "A Generalization of Weighted Subspace Fitting to Full-Rank Models", IEEE Transactions on Signal Processing, IEEE Service Center, New York, NY, US, vol. 49, No. 5, pp. 1002-1012, May 1, 2001.
Dammann, A. et al., "Beamforming in Combination with Space-Time Diversity for Broadband OFDM Systems", ICC 2002. 2002 IEEE International Conference on Communications. Apr. 28-May 2, 2002, pp. 165-171, XP010589479.
European Search Report—EP10184156—Search Authority—Munich—Jun. 14, 2012.
Ken Murakami et al., "Status Toward Standardization at IEEE 802. 3ah and items on the construction of GE-PON system ," Technical Report of the Institute of Electronics, Information and Communication Engineers, Jun. 13, 2003, vol. 103, No. 124, pp. 1-6, IN2003-24.
Physical Channels and Multiplexing in Evolved UTRA Downlink TSG-RAN Working Group 1 Meeting, XX, XX, vol. RI-050590, Jun. 20, 2005, pp. 1-24, XP003006923 the whole document.
Siemens, "Evolved UTRA uplink scheduling and frequency reuse" [online], 3GPP TSG-RAN WG1 # 41 R1-050476, Internet <URL:http://www.3gpp.org/ftp/tsg_ran/WG1_RL1/TSGR1_41/Docs/R1-050476.zip>, May 9, 2005.
Viswanath, P. et al, "Opportunistic Beamforming Using Dumb Antennas" IEEE Transactions on Information Theory, IEEE USA, vol. 48, No. 6, Jun. 2002, pp. 1277-1294, XP002314708 ISSN: 0018-9448 abstract right-hand column, paragraph 1.
Yatawatta, S. et al., "Energy Efficient Channel Estimation in MIMO Systems", 2005 IEEE International Conference on Acoustics, Speech, and Signal Processing, Mar. 18-23, 2005, Philadelphia, vol. 4, pp. 317-320, Mar. 18, 2005.
Miorandi D., et al., "Analysis of master-slave protocols for real-time industrial communications over IEEE 802.11 WLANs" Industrial Informatics, 2004. INDIN '04, 2nd IEEE International Conference on Berlin, Germany Jun. 24-26, 2004. Piscataway, NJ, USA IEEE, Jun. 24, 2004, pp. 143-148, XP010782619, ISBN 0789385136, Para 3, point B.
Anonymous: "3GPP TS 36.211 V8.0.0; Evolved Universal Terrestrial Radio Access (E-UTRA); Physical channels and modulation (Release 8)" 3rd Generation Partnership Project; Technical Specification Group Radio Access Network, [Online] 2007, XP002520076 Retrieved from the Internet: URL:http://www.Sgpp.org/ftp/Specs/html-info/36211.htm> [retrieved on Sep. 27, 2007] Section 5.
Jim Tomcik, QFDD and QTDD: Technology Overview, IEEE 802.20 Working Group on Mobile Broadband Wireless Access, October 28, 2005, pp. 48-50, URL, HTTP://www.IEEE802.org/20/CONTRIBS/C802.20-05-68.ZIP.
Nokia: "Compact signalling of multi-code allocation for HSDPA", version 2,3GPP R1-02-0018, Jan. 11, 2002.
Sethi M, et al., "Code Reuse DS-CDMA—A Space Time Approach", Proceedings of the 2002 IEEE International Conference on Acoustics, Speech, and Signal Processing (ICASSP), pp. 2297-2300, May 13-17, 2002.
Bhushan N., "UHDR Overview", C30-20060522-037, Denver, CO, May 22, 2006, pp. 1-115.

(56) References Cited

OTHER PUBLICATIONS

Samsung: "Uplink Transmission and Multiplexing for EUTRA", 3GPP Draft; R1-050605 UL Multiplexing, Jun. 16, 2005, XP050111420.

Tachikawa (Editor); "W-CDMA Mobile Communication Systems," John Wiley & Sons Ltd., Japan, Maruzen: pp. 82-213, Jun. 25, 2001.

LG Electronics: "PAPR comparison of uplink MA schemes", 3GPP TSG RAN WG1 Meeting #41, R1-050475, May 9-13, 2005, pp. 6.

Motorola,"Uplink Numerology and Frame Structure", 3GPP TAG RAN1 #41 Meeting R1-050397, May 13, 2005.

Samsung Electonics Co. Ltd.; "Uplink Multiple Access and Multiplexing for Evolved UTRA", R1-050439, May 3, 2005, pp. 1-22, XP55018616, Retrieved from the Internet: URL:http://www.3gpp.org/ftp/tsg_ran/WG1_R1/TSGR1/DOCS/ [retrieved on Jul. 2, 2012].

Tomcik J., "QFDD and QTDD: Proposed Draft Air Interface Specification," IEEE C802.20-05/69, IEEE 802.20 Working Group on Mobile Broadband Wireless Access, Oct. 28, 2005, P.1-6,1-7,1-16,6-65,7-11,7-33,7-37~7-55,9-21,9-22,9-24~9-32.

Digital cellular telecommunications system (Phase 2+); General Packet Radio Service (GPRS); Mobile Station (MS)-Base Station System (BSS)interface; Radio Link Control/Medium Access Control (RLC/MAC) protocol (GSM 04.60 version 8.4.1 Release 1999), 3GPP Standard; ETSI EN 301 349, 3rd Generation Partnership Project (3GPP), Mobile Competence Centre; 650, Route Des Lucioles; F-06921 Sophia-Antipolis Cedex; France, No. V8.4.1, Oct. 1, 2000, pp. 1-243, XP050358534.

Institute for Infocom Research et al., "Intra-Node B Macro Diversity based on Cyclic Delay Transmissions", 3GPP TSG RAN WG1 #42 on LTE, R1-050795, Aug. 29-Sep. 2, 2005, pp. 1-5.

Sommer D., et al., "Coherent OFDM transmission at 60 GHz", Vehicular Technology Conference, 1999, VTC 1999—Fall, IEEE VTS 50th Amsterdam, Netherlands Sep. 19-22, 1999, Piscataway, NJ, USA, IEEE, US, vol. 3, Sep. 19, 1999, pp. 1545-1549, XP010353233, DOI: 10.1109/VETECF.1999.801553, ISBN: 978-0-7803-5435-7.

Zhang H., "A new space-time-frequency MIMO-OFDM scheme with cyclic delay diversity", Frontiers of Mobile and Wireless Communication, 2004. Proceedings of the IEEE 6th Circuits and Systems Symposium on vol. 2, Jun. 2, 2004, pp. 647 to 650.

* cited by examiner

CHANNEL QUALITY REPORTING FOR ADAPTIVE SECTORIZATION

CLAIM OF PRIORITY UNDER 35 U.S.C. §119

The present Application for Patent claims priority to Provisional Application Nos. 60/672,575 entitled "CHANNEL QUALITY REPORTING FOR ADAPTIVE SECTORIZATION IN WIRELESS COMMUNICATION SYSTEMS" filed Apr. 19, 2005, and 60/710,419 filed Aug. 22, 2005 which are assigned to the assignee hereof and hereby expressly incorporated by reference herein.

BACKGROUND

Reference to Co-pending Applications for Patent

The present Application for Patent is related to the following co-pending U.S. Patent Applications:

"ADAPTIVE SECTORIZATION IN CELLULAR SYSTEMS", filed concurrently herewith, assigned to the assignee hereof, and expressly incorporated by reference herein; and "Beam-Space Precoding For Sdma Wireless Communication Systems", filed concurrently herewith, assigned to the assignee hereof, and expressly incorporated by reference herein. "SDMA Resource Management", filed concurrently herewith, assigned to the assignee hereof, and expressly incorporated by reference herein; and "Mobile Wireless Access System", filed concurrently herewith, assigned to the assignee hereof, and expressly incorporated by reference herein.

BACKGROUND

I. Field

The following description relates generally to wireless communications, and, amongst other things, to communication schemes for wireless communication systems.

II. Background

Wireless networking systems have become a prevalent means by which a majority of people worldwide has come to communicate. Wireless communication devices have become smaller and more powerful in order to meet consumer needs and to improve portability and convenience. Consumers have found many uses for wireless communication devices such as cellular telephones, personal digital assistants (PDAs) and the like, demanding reliable service and expanded areas of coverage.

A typical wireless communication network (e.g., employing frequency, time, and code division techniques) includes one or more base stations that provide a coverage area and one or more mobile (e.g., wireless) user devices that can transmit and receive data within the coverage area. A typical base station can simultaneously transmit multiple data streams for broadcast, multicast, and/or unicast services, wherein a data stream is a stream of data that can be of independent reception interest to a user device. A user device within the coverage area of that base station can be interested in receiving one, more than one or all the data streams carried by the composite stream. Likewise, a user device can transmit data to the base station or another user device. Such communication between base station and user device or between user devices can be degraded due to channel variations and/or interference power variations. For example, the aforementioned variations can affect base station scheduling, power control and/or rate prediction for one or more user devices.

Performance for a wireless communication system may be enhanced by using beamformed transmissions to communicate from the base station to the mobile devices. Multiple transmit antennas located at a base station can be used to form beamformed transmissions. Beamformed transmissions, also referred to as beams, typically cover a narrower area than transmissions using a single transmit antenna. A beam can be considered a virtual sector allowing a virtual six-sector system to be generated from a conventional three-sector system. However, the signal to interference and noise ratio (SINR) is enhanced within the area covered by the beams. The communication system can utilize a fixed or predetermined set of beams. Although the fixed beam pattern can be updated or adapted, in contrast to a beam steering system, the beams in a fixed beam system are not dynamically updated based on individual user devices.

Typically, user devices should be assigned to appropriate beams to optimize channel performance. In addition, the beamforming system can utilize a variety of scheduling techniques based upon spatial, frequency or time divisions. The system should select the technique or combination of techniques to optimize channel performance, and consequently system performance. Thus, there exists a need in the art for a system and/or methodology for monitoring channel quality to optimize selection of beams and transmission techniques.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with enhancing performance in a wireless communication system using beamforming transmissions. According to one aspect, the channel quality is monitored. Channel quality indicators can be used to select a scheduling technique, such as space division multiplexing (SDM), multiple-input multiple output (MIMO) transmission and opportunistic beamforming for one or more user devices. In addition, the CQI can be used to determine the appropriate beam assignment or to update the beam pattern.

To that end, a method for enhancing performance for a wireless communication environment is described herein. The method can include generating a first pilot, transmitting the first pilot and receiving at least one channel quality indicator (CQI) based at least in part upon the first pilot. The method can also comprise scheduling at least one user device based at least in part upon the at least one CQI. Additionally, the method can comprise assigning a user device to a beam based upon the at least one CQI. The method can also comprise generating a second pilot, transmitting the second pilot on a second beam and receiving a second CQI based at least in part upon the second pilot. Moreover, the method can comprise receiving a pilot, determining a CQI based at least in part upon the pilot and transmitting the CQI to a base station.

According to yet another aspect, an apparatus for wireless communication can comprise a processor configured to generate a first pilot, transmit the first pilot and receive at least one CQI based at least in part upon the first pilot and a memory coupled with the processor. The processor can also be configured to schedule at least one user device based at least in part upon the at least one CQI. Additionally, an apparatus can comprise a processor configured to receive a pilot, determine at least one CQI based at least in part upon the pilot and transmit the CQI to a base station.

According to another aspect, an apparatus for enhancing performance for a wireless communication environment can comprise a means for generating a first pilot, a means for transmitting the first pilot and a means for receiving at least one channel quality indicator (CQI) based at least in part upon the first pilot. The apparatus can also comprise a means for generating a second pilot, a means for transmitting the second pilot on a second beam and means for receiving a second CQI based at least in part upon the second pilot.

Yet another aspect relates to a computer-readable medium having stored thereon computer-executable instructions for generating a first pilot, transmitting the first pilot, receiving at least one channel quality indicator (CQI) based at least in part upon the first pilot and scheduling at least one user device based at least in part upon the at least one CQI. In addition, the instructions can comprise generating a second pilot, transmitting the second pilot on a second beam and receiving a second CQI based at least in part upon the second pilot.

Yet another aspect relates to a processor that executes instructions for enhancing performance for a wireless communication environment, the instructions can comprise generating a first pilot, transmitting the first pilot, receiving at least one channel quality indicator (CQI) based at least in part upon the first pilot and scheduling at least one user device based at least in part upon the at least one CQI. Additionally, the instructions can comprise generating a second pilot, transmitting the second pilot on a second beam and receiving a second CQI based at least in part upon the second pilot.

A further aspect sets forth a mobile device that can comprise a component that generates a first pilot, a component that transmits the first pilot and a component that receives at least one channel quality indicator (CQI) based at least in part upon the first pilot. Moreover, the mobile device is at least one of a cellular phone, a smartphone, a handheld communication device, a handheld computing device, a satellite radio, a global positioning system, a laptop, and a PDA.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
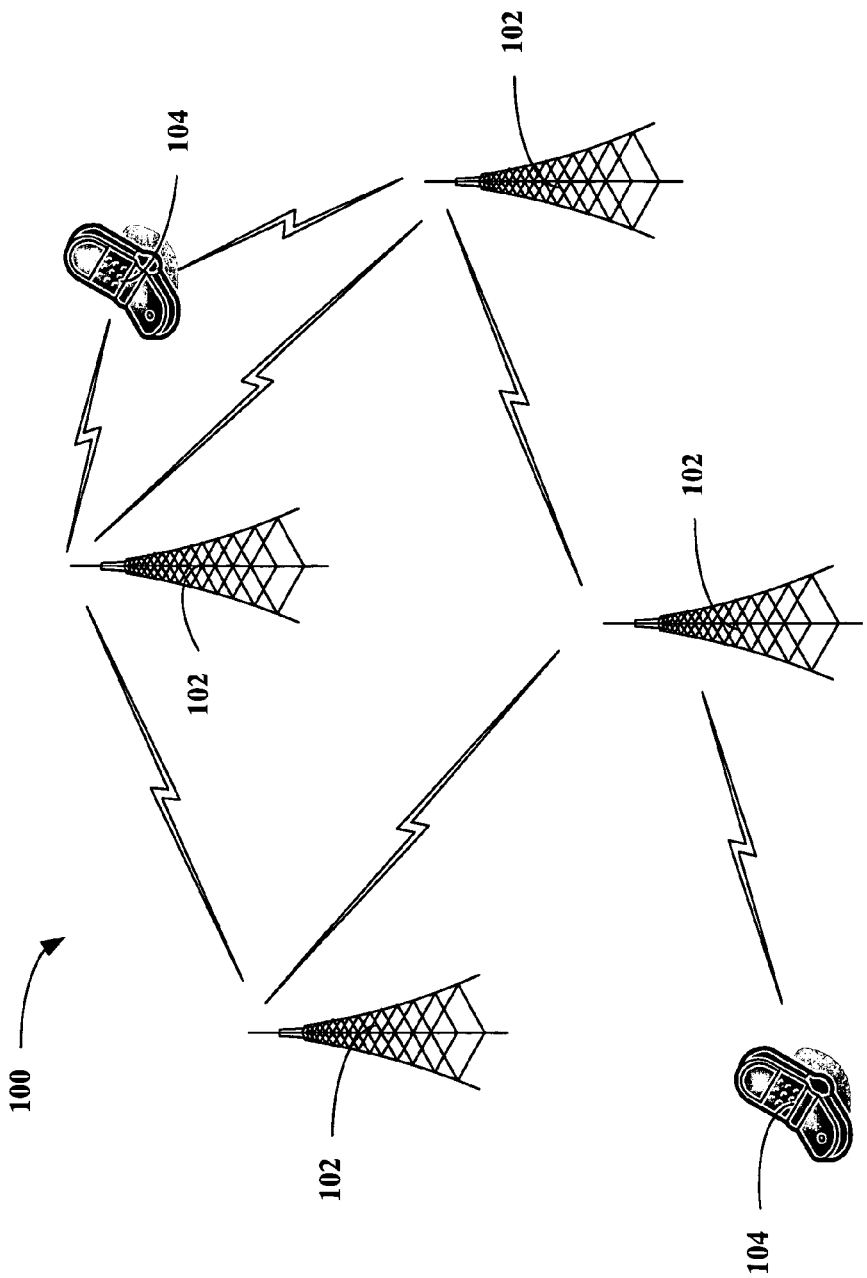
FIG. 1 is an illustration of a wireless communication system according to one or more aspects presented herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

Furthermore, various embodiments are described herein in connection with a user device. A user device can also be called a system, a subscriber unit, subscriber station, mobile station, mobile device, remote station, access point, base station, remote terminal, access terminal, user terminal, terminal, user agent, or user equipment (UE). A user device can be a cellular telephone, a cordless telephone, a Session Initiation Protocol (SIP) phone, a wireless local loop (WLL) station, a PDA, a handheld communications or computing device having wireless connection capability, a smartphone, a satellite radio, a global position system, a laptop, or other processing device connected to a wireless modem.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ).

While the disclosure discusses beamforming as a mode of operation, the disclosure and its contents may substantially be applied to precoded or beam-steered transmissions. This may be performed by, for example, utilizing fixed or predetermined matrices or vectors for which a user is scheduled.

Referring now to FIG. 1, a wireless communication system 100 in accordance with various embodiments presented herein is illustrated. System 100 can comprise one or more base stations 102 in one or more sectors that receive, transmit, repeat, etc., wireless communication signals to each other and/or to one or more mobile devices 104. Each base station 102 can comprise multiple transmitter chains and receiver chains, e.g. one for each transmit and receive antenna, each of which can in turn comprise a plurality of components associated with signal transmission and reception (e.g., processors, modulators, multiplexers, demodulators, demultiplexers, antennas, etc.). Mobile devices 104 can be, for example, cellular phones, smart phones, laptops, handheld communication devices, handheld computing devices, satellite radios, global positioning systems, PDAs, and/or any other suitable device for communicating over wireless system 100. In addition, each mobile device 104 can comprise one or more transmitter chains and a receiver chains, such as used for a multiple input multiple output (MIMO) system. Each transmitter and receiver chain can comprise a plurality of components associated with signal transmission and reception (e.g., processors, modulators, multiplexers, demodulators, demultiplexers, antennas, etc.), as will be appreciated by one skilled in the art.

Figure 2:
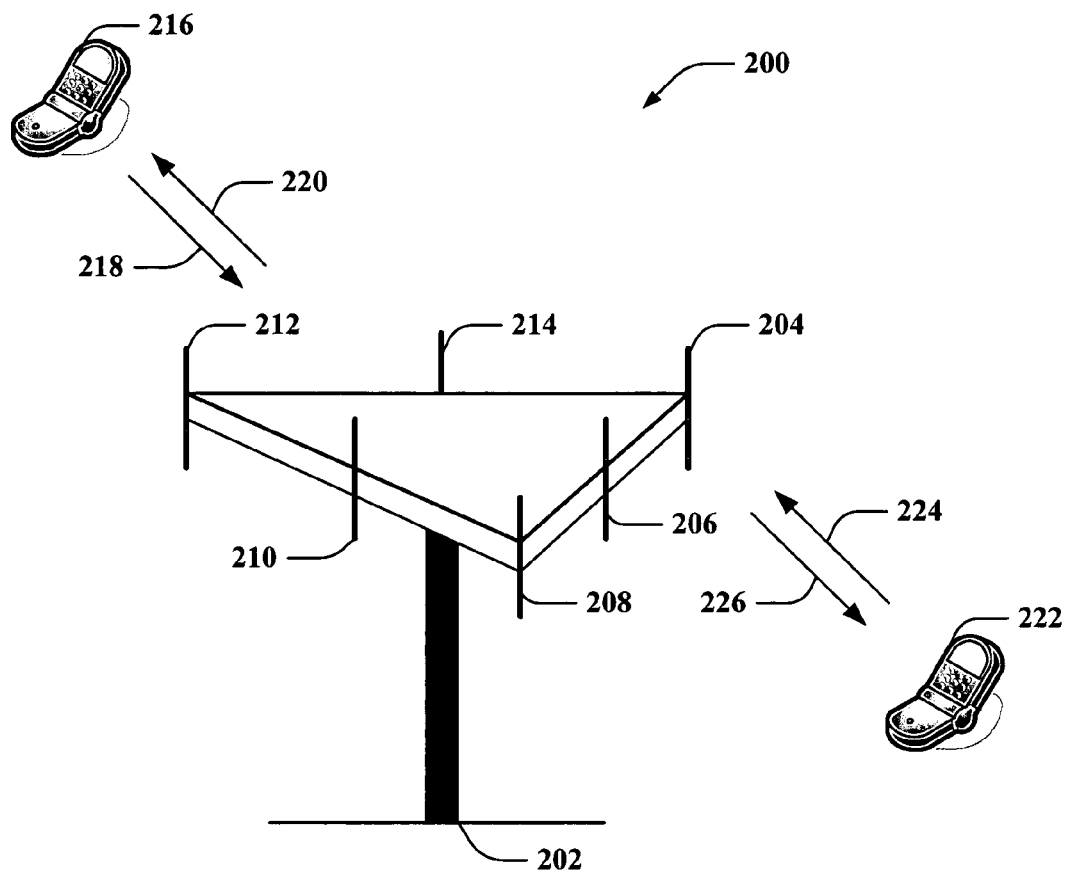
FIG. 2 is an illustration of a wireless communication system according to one or more aspects presented herein.

Referring now to FIG. 2, a multiple access wireless communication system 200 according to one or more embodiments is illustrated. A 3-sector base station 202 includes multiple antenna groups, one including antennas 204 and 206, another including antennas 208 and 210, and a third including antennas 212 and 214. According to the figure, only two antennas are shown for each antenna group, however, more or fewer antennas may be utilized for each antenna group. Typically, beamforming techniques require multiple transmit antennas to transmit beams. Mobile device 216 is in communication with antennas 212 and 214, where antennas 212 and 214 transmit information to mobile device 216 over forward link 220 and receive information from mobile device 216 over reverse link 218. Forward link (or downlink) refers to the communication link from the base stations to mobile devices, and the reverse link (or uplink) refers to the communication link from mobile devices to the base stations. Mobile device 222 is in communication with antennas 204 and 206, where antennas 204 and 206 transmit information to mobile device 222 over forward link 226 and receive information from mobile device 222 over reverse link 224.

Each group of antennas and/or the area in which they are designated to communicate may be referred to as a sector of base station 202. In one or more embodiments, antenna groups each are designed to communicate to mobile devices in a sector or the areas covered by base station 202. A base station may be a fixed station used for communicating with the terminals and may also be referred to as an access point, a Node B, or some other terminology.

A wireless communication system can include one or more base stations in contact with one or more user devices. Each base station provides coverage for a plurality of sectors. In communication with a user device, the transmitting antennas of a base station can utilize beam-forming techniques in order to improve the signal-to-noise ratio of forward links for the different mobile devices. Additionally, a base station using beamforming to transmit to mobile devices scattered randomly through its coverage area can cause less interference to mobile devices in neighboring cells/sectors than a base station transmitting through a single antenna to all mobile devices in its coverage area. Generally, beams generated by multiple transmit antennas are narrower than the coverage area of a single antenna. While user devices in the areas covered by beams experience an enhanced SINR, user devices within the null region experience a low SINR, possibly leading to loss of data. In general, user devices in the null region are worse off than if a single transmit antenna had been utilized to transmit data. In addition, if a user device located within a beam selects the wrong beam for communications, the user device will experience the same decrease in performance as user devices located in the null region.

Figure 3:
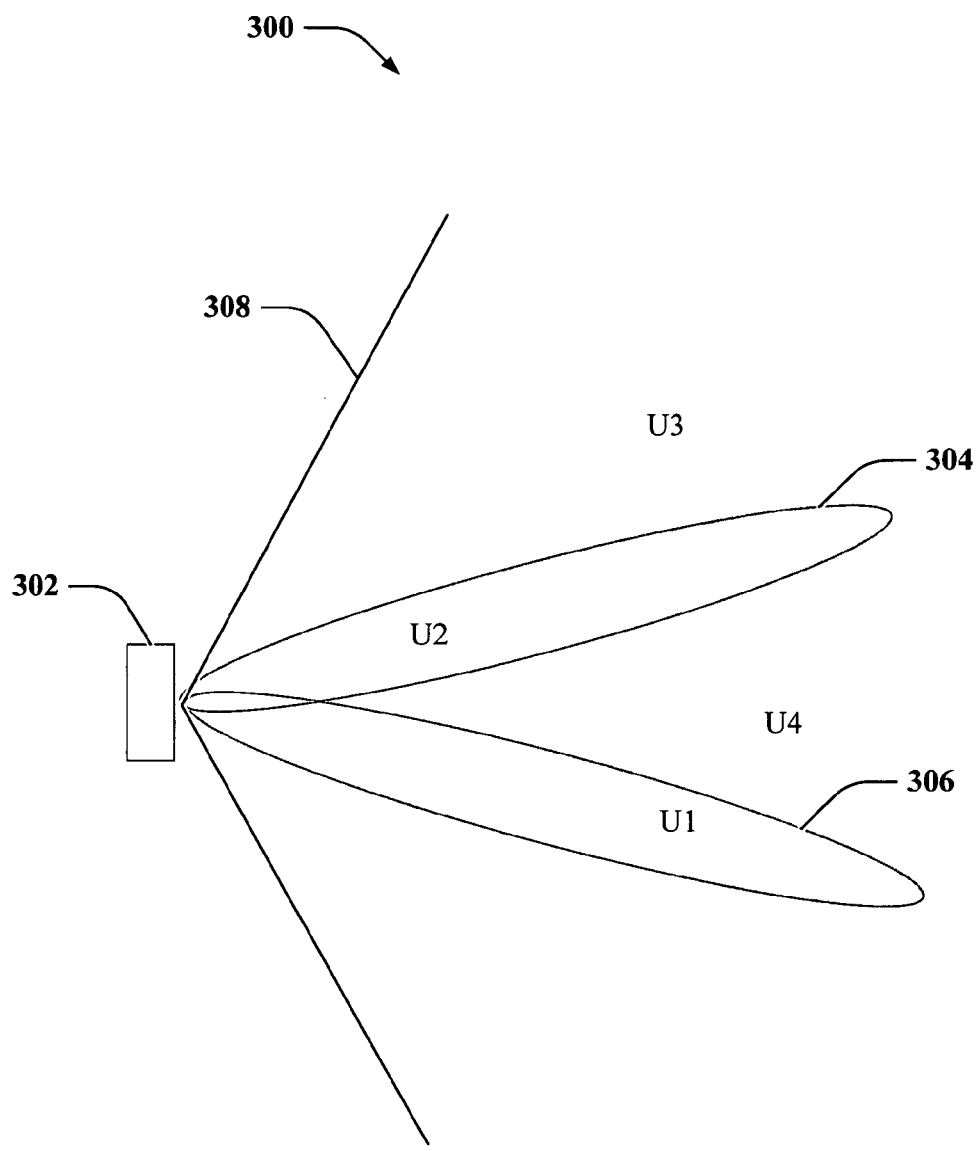
FIG. 3 illustrates a beam pattern for a wireless communication system in accordance with various aspects presented herein.

FIG. 3 illustrates a beam pattern 300 for use in a wireless communication system in accordance with one or more embodiments presented herein. Base station transmit antennas can generate beams covering predetermined areas, resulting in a fixed beam pattern. The beam pattern can be adjusted periodically or adjustment of the pattern can be event driven. For example, the beam pattern can be modified based upon patterns of communication between the user devices and the base station. In the beam pattern illustrated in FIG. 3, multiple antennas at a base station 302 emit a first fixed beam 304 and a second fixed beam 306 for a sector 308. The number of beams shown has been limited to two for the sake of simplicity; however, multiple, additional fixed beams may be generated. Beams may be generally orthogonal as shown in FIG. 3 or the coverage area of the beams may overlap. Users U1 and U2 are located within the coverage area of beams 306 and 304, respectively. Consequently, Users U1 and U2 experience an enhanced SINR, similar to the benefits experienced by users in a beam-steering system. In contrast, Users U3 and U4 will experience an extremely low SNR since they are located within the null region of the beams 306 and 304. In fact, the performance for users U3 and U4 may be worse than if a single transmit antenna had been utilized. In addition, user devices may experience reduced SINR if the user device selects the wrong beam. For example, user device U1 is located within the coverage are of second beam 306. However, if user device U1 were to incorrectly elect transmissions over first beam 304 or if the user device U1 is assigned to first beam 304 by the base station, the user device will experience the same performance as if the user device was located in the null region.

Beamforming techniques can be used to provide fixed transmit directions in sectors or may be used in lieu of sectors. For example, beam patterns may provide multiple transmit directions in the sectors of a 3-sector base station, resulting in a virtual 6-sector base station. This ability to subdivide sectors when combined with various scheduling techniques results in increased system capacity.

Beamformed transmissions may be used with a number of different scheduling schemes, including space division multiplexing (SDM). SDM is a technique used in a multiple antenna communication system that utilizes the spatial dimensions to support additional user devices for data transmissions. In a space division multiple access system (SDMA) system, the base station can use the same frequencies to transmit to multiple user devices at the same time where the user devices are assigned to separate beams.

The multiple input multiple output (MIMO) and opportunistic beamforming scheduling techniques can be used with fixed beamforming patterns. In particular, user devices with well-conditioned matrix channels can be scheduled using MIMO. In a MIMO system, multiple data streams corresponding to a single user device are scheduled at the same time and frequency on multiple beams, thereby increasing the data rate. In contrast, in opportunistic beamforming, also referred to as beam selection, the base station transmits to a single user device over a given set of frequencies and time using a single beam. No other beams are used for transmission to any other user over those frequencies and at those times.

SDM, MIMO and opportunistic beamforming can be used with frequency division systems such as an orthogonal frequency division multiple access (OFDMA) system. An OFDMA system partitions the overall system bandwidth into multiple orthogonal subbands. These subbands are also referred to as tones, carriers, subcarriers, bins, and/or frequency channels. Each subband is associated with a subcarrier that can be modulated with data. An OFDMA system may use time and/or frequency division multiplexing to achieve orthogonality among multiple data transmissions for multiple user devices. Groups of user devices can be allocated separate subbands, and the data transmission for each user device may be sent on the subband(s) allocated to this user device. SDMA, MIMO and opportunistic beamforming can be implemented for user device allocated to different frequency regions.

In a beamformed transmission system, beamforming techniques can be utilized to provide fixed transmit directions in sectors or may be used in lieu of sectors. For example, beam patterns may provide multiple transmit directions in the sectors of a 3-sector base station, resulting in a virtual 6-sector base station. This ability to subdivide sectors results in increased system capacity. User devices served by a base station sector can indicate a preference for a given beam. The base station may schedule transmission with the user device on the given beam using SDM, MIMO, opportunistic beamforming or any other scheduling method. In addition, beamforming with a fixed beam pattern allows a base station to utilize SDM, MIMO and opportunistic beamforming scheduling techniques simultaneously. For example, spatially orthogonal user devices may be scheduled using SDM, user devices with well-conditioned matrix channels could be scheduled using MIMO and additional users could be scheduled using opportunistic beamforming. It should be noted that in the case of precoding or beam steering, the directions shown may be one direction or the dominant direction of the beam.

Referring to FIGS. 4-7, methodologies relating to increasing performance and capacity in wireless communication systems are illustrated. For example, methodologies can relate to using beamforming and channel quality monitoring in an SDMA environment, in an FDMA environment, an OFDMA environment, a CDMA environment, a WCDMA environment, a TDMA environment or any other suitable wireless environment. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be utilized to implement a methodology in accordance with one or more embodiments.

Figure 4:
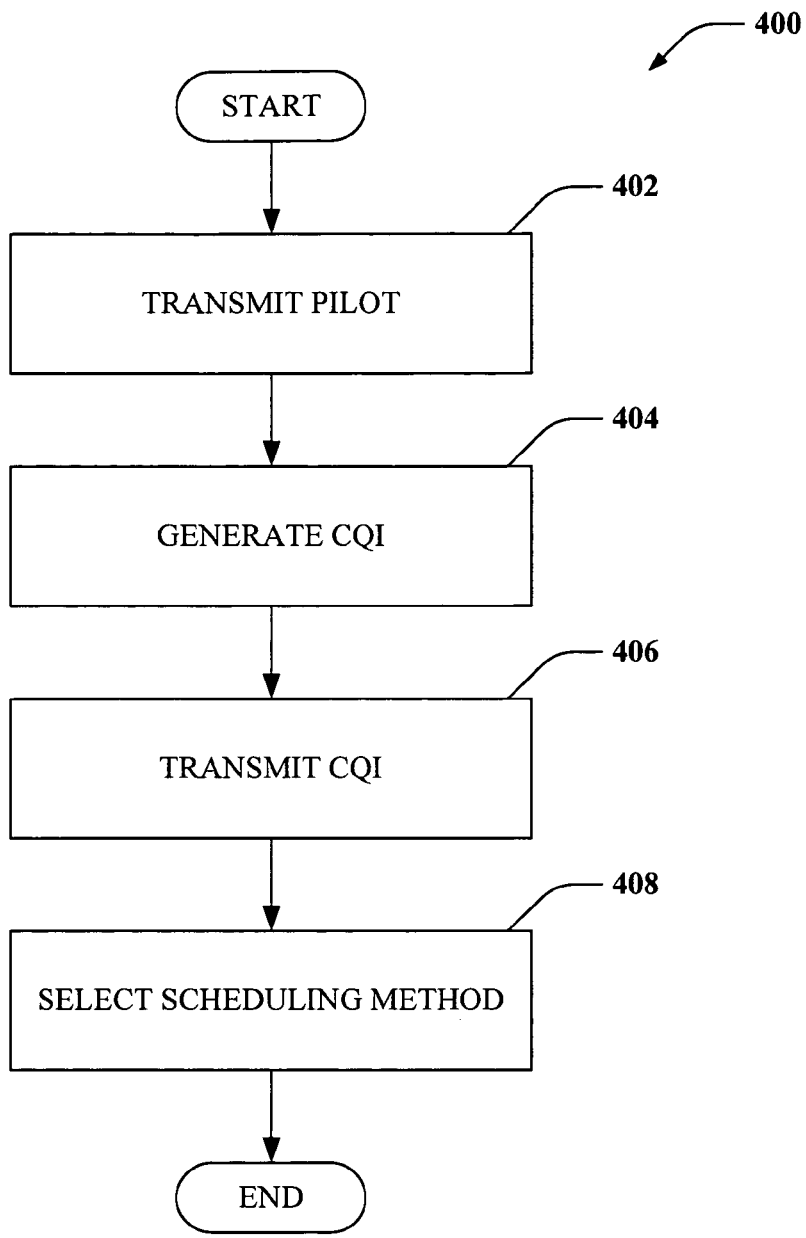
FIG. 4 illustrates a methodology for monitoring channel quality in accordance with one or more aspects presented herein.

Referring now to FIG. 4, a methodology 400 for monitoring channel quality in accordance with one or more aspects is illustrated. At 402, a pilot can be transmitted to the user devices. A pilot, as used herein is a signal, generally transmitted over a communication system and can be used for control, synchronization or reference purposes. A channel quality indicator (CQI) can be determined or estimated based upon the received pilot at 404. Typically, a CQI can be a quantity such as the SINR for the channel or the supportable rate over the channel. After the CQI is determined, it can be communicated to the base station at 406. At 408, the CQI can be used to determine scheduling technique and/or the beam assignment for one or more user devices. Using CQI in scheduling and assignment determination can optimize individual channel and overall system performance.

Figure 5:
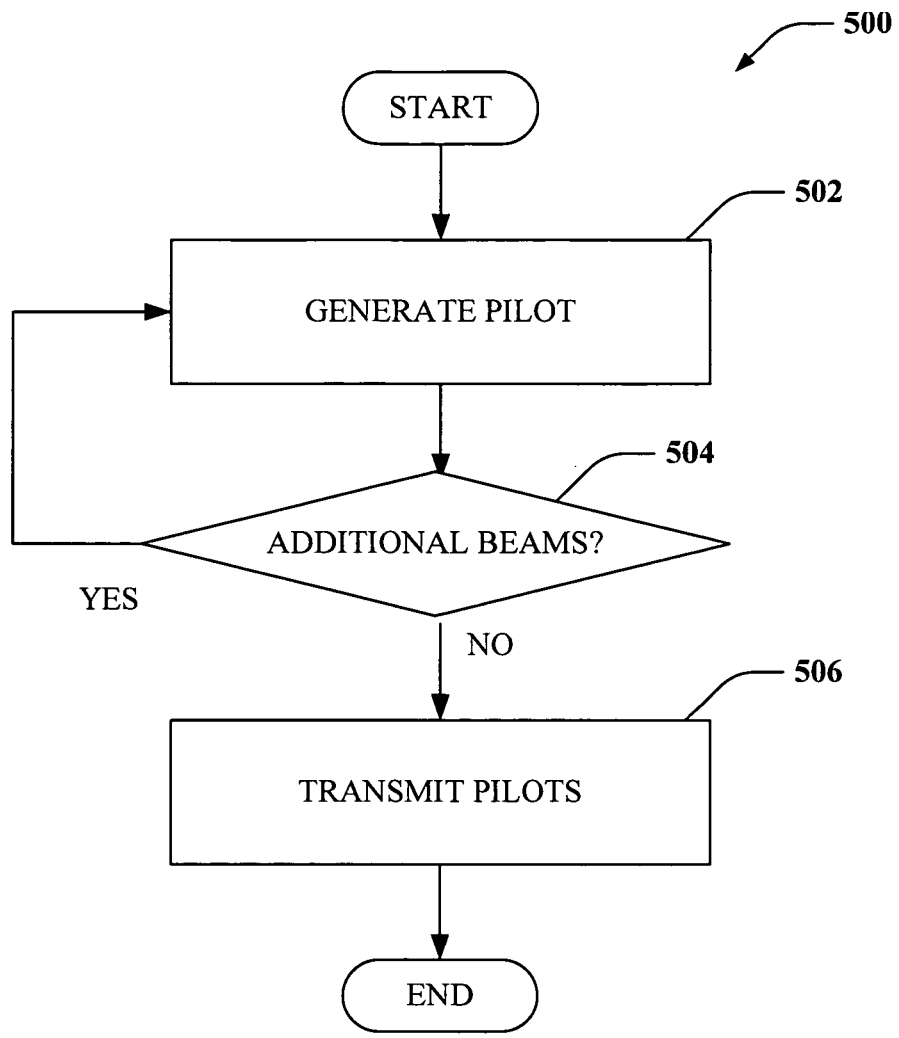
FIG. 5 illustrates a methodology using a dedicated pilot to monitor channel quality in accordance with one or more aspects presented herein.

Referring now to FIG. 5, a methodology 500 for transmitting a dedicated pilot in accordance with one or more aspects is illustrated. In a dedicated pilot system, the base station transmits a separate pilot for each beam in the sector. Use of dedicated beams allows the CQI for each beam to be determined. At 502, a pilot is generated for a particular beam. At 504, it is determined whether there are additional beams within the sector. If yes, the method returns to 502 to generate a pilot for the next beam. If no, all of the pilots can be transmitted on their respective beams at 506. Alternatively, all pilots can be calculated and transmitted one at a time. In one or more aspects, the pilots can be stored in a lookup table. The pilots can be read from the lookup table prior to transmission on the beams, as opposed to generating the pilots each time the pilots are to be transmitted. The pilots can be recalculated and the lookup table updated periodically or recalculation and update of the table can be event driven. For example, pilots can be updated based upon changes to the beam pattern.

Transmitting the pilot to the user devices provides the user devices with the data necessary to determine a CQI per beam or virtual sector. The pilots allow broadband channel measurements to be made. The pilot can also be used to reconstruct the channel when beams are used simultaneously. For example, when the SDMA scheduling technique is used, the pilot allows the channel to be reconstructed and the SDMA CQI to be computed. Using dedicated pilots can be particularly effective when the number of beams is less than the number of transmit antennas in the sector.

In one or more aspects, a common pilot can be used to determine CQIs. A common pilot is transmitted on every transmit antenna for the sector. The transmit antennas can be trained in several directions. The user devices can reconstruct the beams based upon a set of beam weights. Use of a common pilot is particularly useful when there are more beams in the beam pattern than available transmit antennas. For example, where there are three transmit antennas and eight beams in the sector, the antennas can be trained in three separate directions and the user devices can use a set of beam weights for each of the eight beams to reconstruct the beams. The user devices can receive the common pilot and estimate the broadband channel on each transmit antenna based upon the common pilot. The user devices can reconstruct the channels and interference and then calculate the CQI based upon the channel estimates and a set of beam weights for the appropriate beam. In one or more embodiments, beams are formed using a set of weights, that alter the phase, amplitude, or phase and amplitude of a particular transmission symbol or sample. These weights can be stored in a lookup table in memory. The beam pattern can be updated by modifying the weights stored in the lookup table. The beam weights can be stored in a lookup table for use in CQI calculations. The beams can be fixed or the base station can signal a set of beam weights to the user devices using the overhead channels. Use of the common pilot can be particularly effective when the beams either are fixed or change very slowly, such that the beam weights do not need to be updated frequently. If the beam pattern is updated, the base station should signal the user device and send/signal the updated set of beam weights. It should be understood that if the beam weights are known by the user device, they need not be transmitted to the user device.

User devices can utilize either common or dedicated pilot to estimate a beam selection, SDMA and/or MIMO CQI for the sector that services the user device. The beam selection, SDMA and MIMO CQIs can be compared to determine the optimal scheduling method for a user device. In addition, the user device can estimate the CQIs for beams from other sectors. The CQIs for beams from other sectors can be reported at a slower rate than the CQI for the sector that services the user device to reduce overhead. In addition, the user device can track the control channel CQI. In general, the control channel is transmitted on the beam with the largest area of coverage. The CQI for the control channel is particularly important for purposes such as power control.

In one or more aspects, the user device reports one or more CQIs to the base station. The base station can use the CQI feedback to determine the appropriate scheduling technique for the user devices. The user device can report CQIs within the signal, such that the base station receives CQIs continually. For example, the user device can report the CQI for all scheduling techniques within every frame or data packet transmitted to the base station. However, this may result in excessive overhead for the system. Alternatively, the user devices can send the CQI for the mode in which the user device is scheduled. For example, a user device scheduled using beam selection can transmit the beam selection CQI based upon the beam selection schedule; a user device using SDMA can transmit the SDMA CQI based on SDMA schedule and so forth. In addition, user devices can transmit using punctured coding. The control channel CQI can be punctured with some combination of the non-control channel CQIs.

Figure 6:
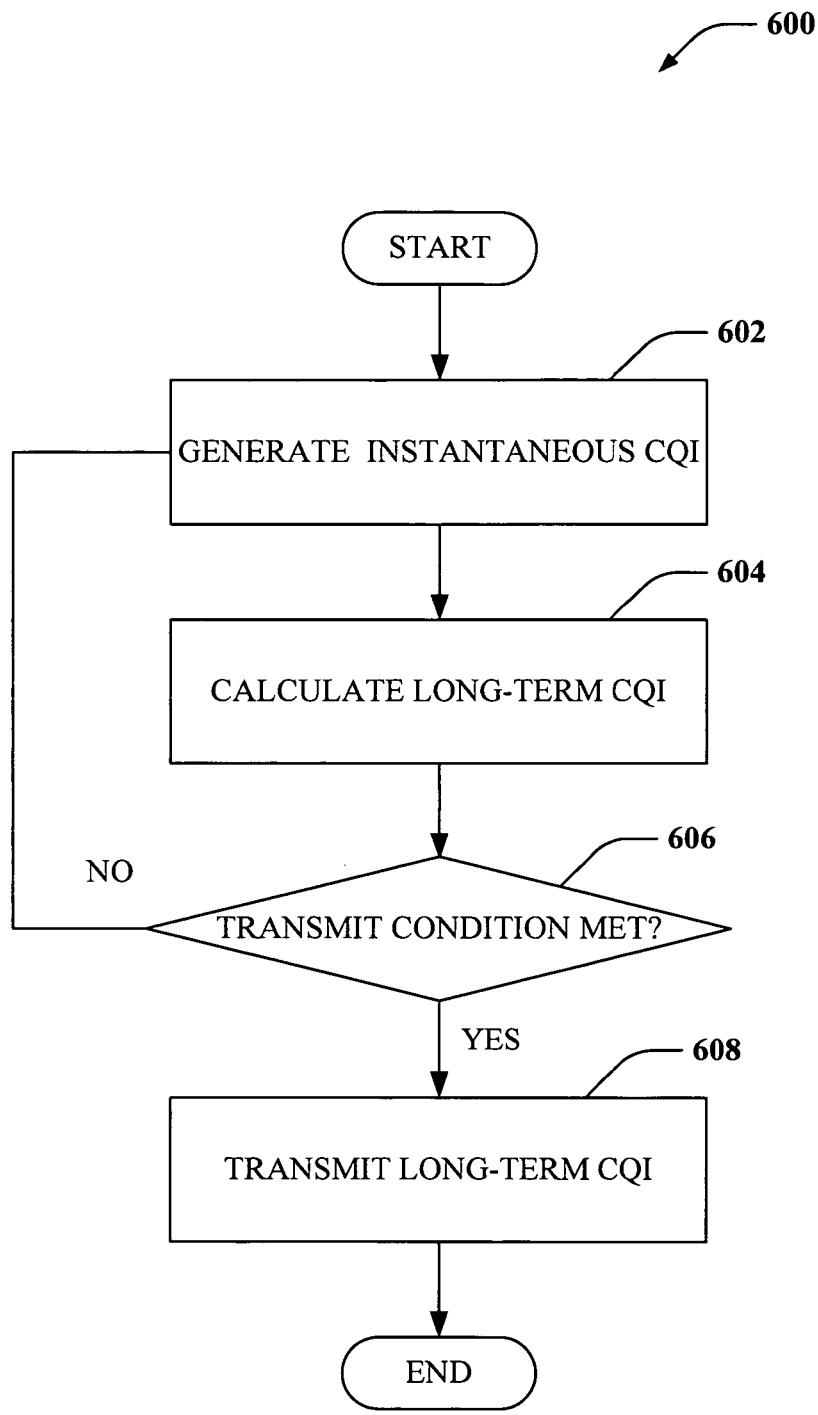
FIG. 6 illustrates a methodology for monitoring channel quality using a long term CQI in accordance with one or more aspects presented herein.

Referring now to FIG. 6, a methodology 600 for monitoring channel quality using a long term CQI in accordance with one or more aspects is illustrated. In one or more aspects, the system can utilize a long term CQI to select scheduling techniques and/or beam assignments for user devices. Using a long term CQI rather than an instantaneous CQI can prevent a user device from being switched between beams or scheduling techniques due to temporary fluctuations in the instantaneous CQI. At 602, an instantaneous CQI is calculated. A long term CQI can be calculated based upon the instantaneous CQI, at 604. The long term CQI can be calculated by averaging the instantaneous CQI with prior CQIs values. A table of prior CQI values and/or average of prior values can be stored and the values or average used to calculate the long term CQI. In addition, weighted averaging can be used to calculate the long term CQI. At 606, it is determined whether the conditions have been met to report the long term CQI to the base station. If yes, the long term CQI is transmitted at 608. If no, the next instantaneous CQI is calculated at 602. The CQI can be reported periodically based upon a predetermined period of time or based upon the number of instantaneous CQIs calculated. Alternatively, transmission of the long term CQIs can be event driven. For example, the long term CQIs can be reported to the base station when the beam pattern changes, when a user device transitions from a region covered by one beam to a region covered by a second beam or when the CQI falls below a certain predetermined threshold. In addition, the user devices can report both long term and instantaneous CQIs to the base station.

User devices can be reassigned to beams or the entire beam pattern can be modified depending upon the CQI values. In general, user devices are capable of relocating or being relocated during voice or data transmission, and may move into or out of the coverage area provided by the beam to which they area assigned. User devices should be reassigned as they move through the sector from the coverage area of one beam to another. In addition, based upon the CQIs reported by multiple users, the base station can adjust the beam pattern to better service the group of user devices.

It will be appreciated that, in accordance with one or more embodiments described herein, inferences can be made regarding transmission formats, frequencies, etc. As used herein, the term to "infer" or "inference" refers generally to the process of reasoning about or inferring states of the system, environment, and/or user from a set of observations as captured through events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or methods presented above can include making inferences regarding the scheduling technique or beam assignment for one or more user devices. For example, it can be determined that the user device has left the region covered by a first beam and entered a region covered by a second beam and therefore, the user device should be reassigned to the second beam. In addition, it can be determined that the beam pattern is suboptimal for multiple user devices and the beam pattern can be modified.

According to another example, inferences can be made relating to the scheduling techniques to employ during various times of the day, week, etc., such as peak hours and the like. It will be appreciated that the foregoing examples are illustrative in nature and are not intended to limit the number of inferences that can be made or the manner in which such inferences are made in conjunction with the various embodiments and /or methods described herein.

Figure 7:
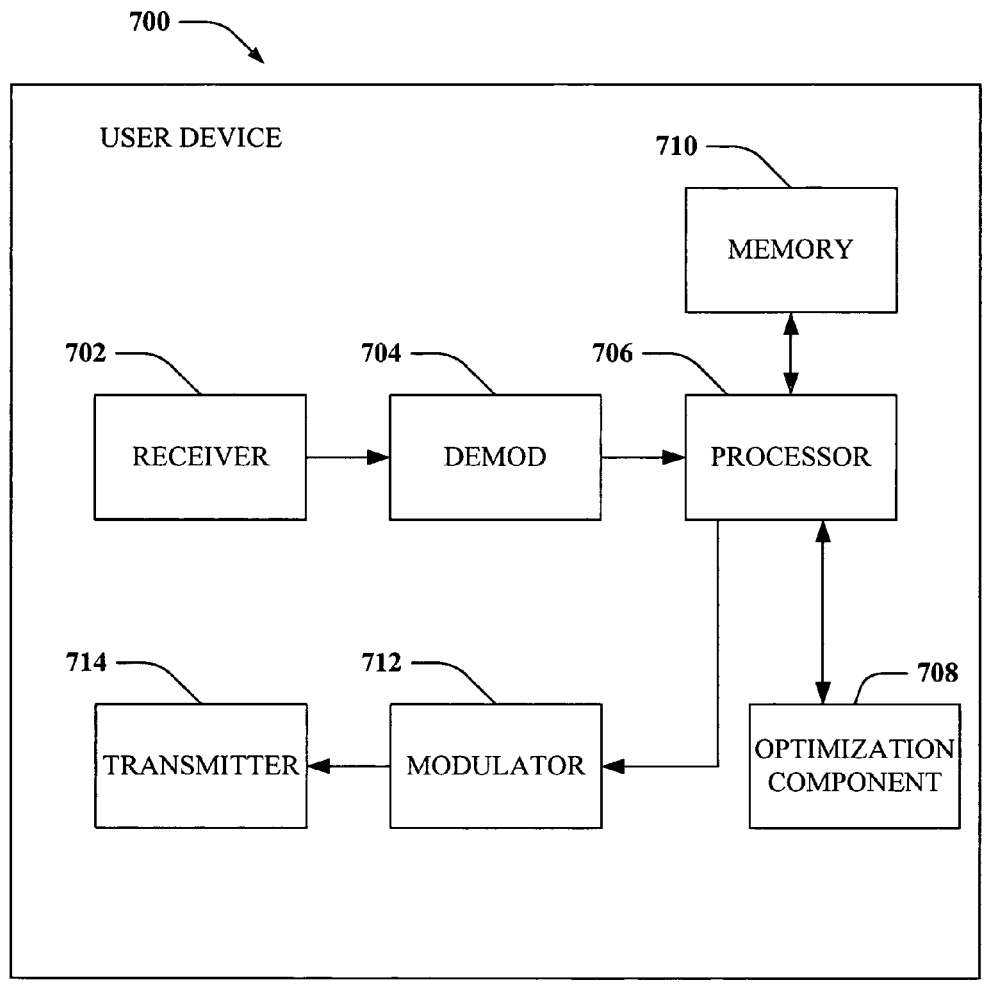
FIG. 7 is an illustration of a system that monitors channel quality to improve performance in a wireless communication environment in accordance with various aspects presented herein.

FIG. 7 is an illustration of a system 700 that facilitates beamforming in a wireless communication environment to increase system capacity limits in accordance with one or more embodiments set forth herein. System 700 can reside in a base station and/or in a user device, as will be appreciated by one skilled in the art. System 700 comprises a receiver 702 that receives a signal and from, for instance one or more receive antennas, and performs typical actions thereon (e.g., filters, amplifies, downconverts, etc.) the received signal and digitizes the conditioned signal to obtain samples. A demodulator 704 can demodulate and provide received pilot symbols to a processor 706 for channel estimation.

Processor 706 can be a processor dedicated to analyzing information received by receiver component 702 and/or generating information for transmission by a transmitter 714. Processor 706 can be a processor that controls one or more components of user device 700, and/or a processor that analyzes information received by receiver 702, generates information for transmission by a transmitter 714, and controls one or more components of user device 700. Processor 806 can utilize any of the methodologies described herein, including those described with respect to FIGS. 4-6, to coordinate communications. In addition, user device 700 can include an optimization component 708 that coordinates beam assignments and/or selects scheduling techniques. Optimization component 708 may be incorporated into the processor 706. It is to be appreciated that optimization component 708 can include optimization code that performs utility based analysis in connection with assigning user devices to beams and/or scheduling techniques. The optimization code can utilize artificial intelligence based methods in connection with performing inference and/or probabilistic determinations and/or statistical-based determinations in connection with optimizing user device beam assignments.

User device 700 can additionally comprise memory 710 that is operatively coupled to processor 706 and that can store information related to beam pattern information, CQI data, lookup tables comprising information related thereto, and any other suitable information related to beamforming and channel monitoring as described herein. Memory 710 can additionally store protocols associated with generating lookup tables, etc., such that user device 700 can employ stored protocols and/or algorithms to increase system capacity and performance. It will be appreciated that the data store (e.g., memories) components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 710 of the subject systems and methods is intended to comprise, without being limited to, these and any other suitable types of memory. The processor 706 is connected to a symbol modulator 712 and transmitter 714 that transmits the modulated signal.

Figure 8:
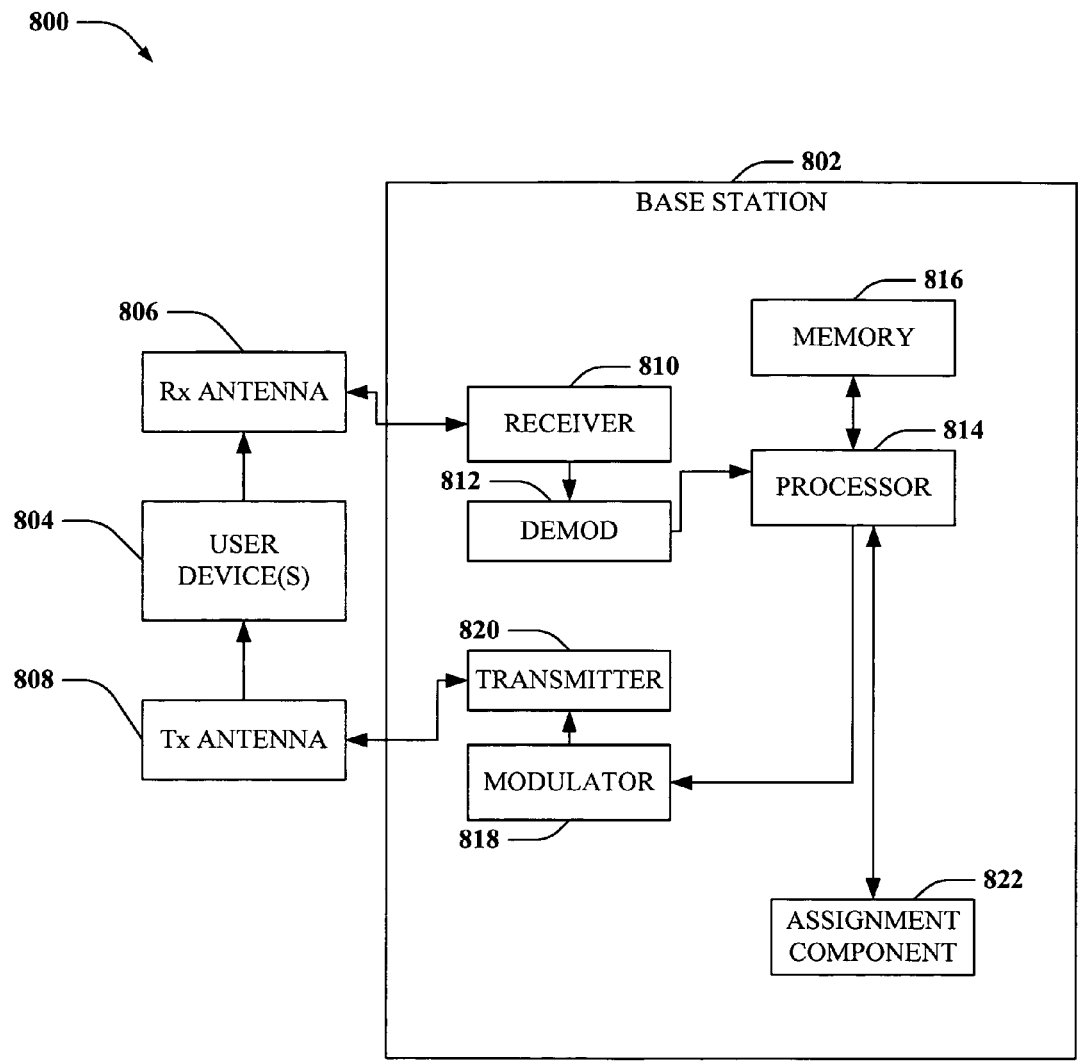
FIG. 8 is an illustration of a system that monitors channel quality to improve performance in a wireless communication environment in accordance with various aspects presented herein.

FIG. 8 is an illustration of a system 800 that facilitates increasing system capacity or performance in a communication environment in accordance with various embodiments. System 800 comprises a base station 802 with a receiver 810 that receives signal(s) from one or more user devices 804 through one or more receive antennas 806, and transmits to the one or more user devices 804 through a plurality of transmit antennas 808. In one or more embodiments, receive antennas 806 and transmit antennas 808 can be implemented using a single set of antennas. Receiver 810 can receive information from receive antennas 806 and is operatively associated with a demodulator 812 that demodulates received information. Receiver 810 can be, for example, a Rake receiver (e.g., a technique that individually processes multi-path signal components using a plurality of baseband correlators, ...), an MMSE-based receiver, or some other suitable receiver for separating out user devices assigned thereto, as will be appreciated by one skilled in the art. According to various aspects, multiple receivers can be employed (e.g., one per receive antenna), and such receivers can communicate with each other to provide improved estimates of user data. Demodulated symbols are analyzed by a processor 814 that is similar to the processor described above with regard to FIG. 7, and is coupled to a memory 816 that stores information related to user device assignments, lookup tables related thereto and the like. Receiver output for each antenna can be jointly processed by receiver 810 and/or processor 814. A modulator 818 can multiplex the signal for transmission by a transmitter 820 through transmit antennas 808 to user devices 804.

Base station 802 further comprises an assignment component 822, which can be a processor distinct from or integral to processor 814, and which can evaluate a pool of all user devices in a sector served by base station 804 and can assign user devices to beams and/or scheduling techniques based at least in part upon the CQIs for the channel of the individual user devices.

Figure 9:
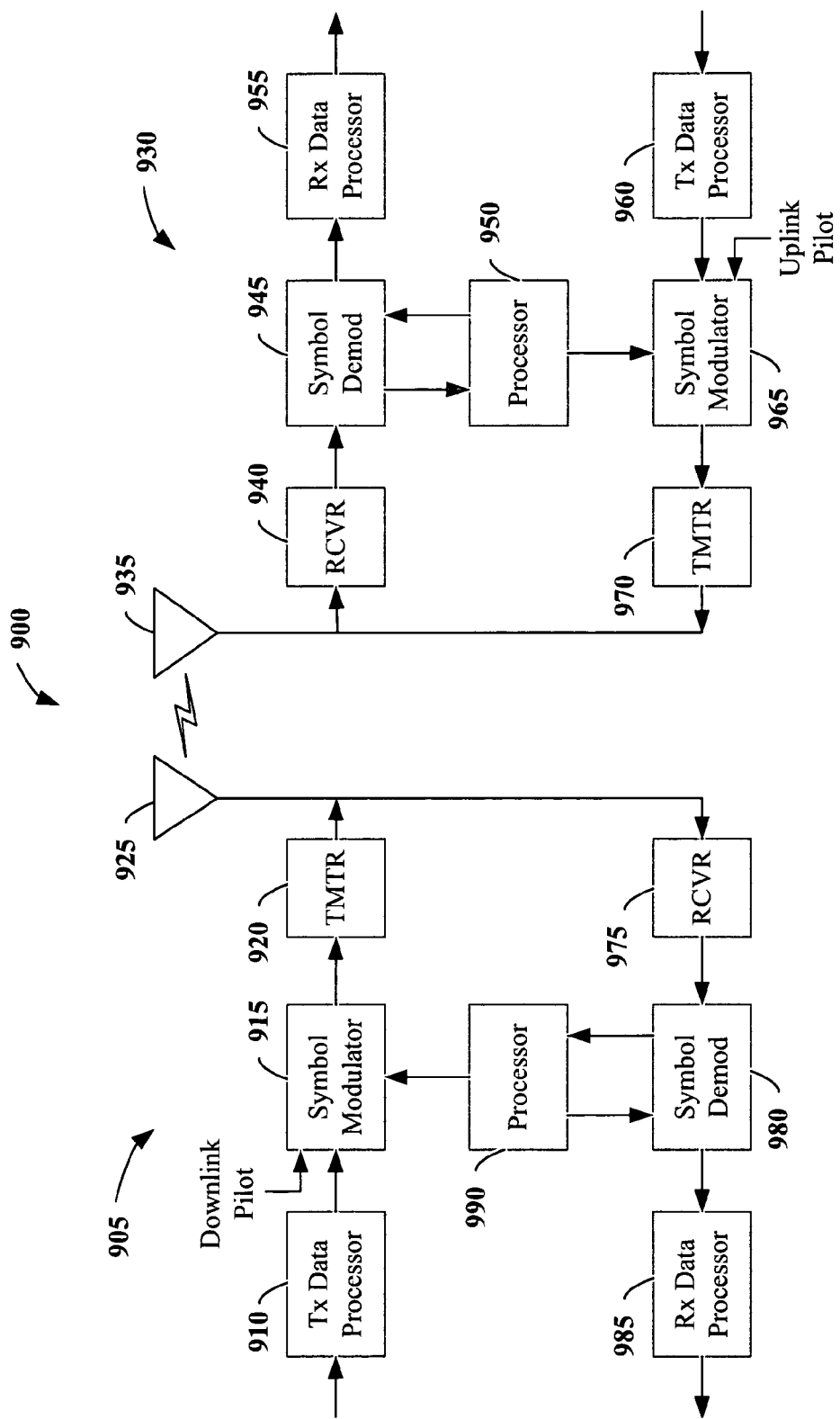
FIG. 9 is an illustration of a wireless communication environment that can be employed in conjunction with the various systems and methods described herein.

FIG. 9 shows an exemplary wireless communication system 900. The wireless communication system 900 depicts one base station and one user device for sake of brevity. However, it is to be appreciated that the system can include more than one base station and/or more than one user device, wherein additional base stations and/or user devices can be substantially similar or different from the exemplary base station and user device described below. In addition, it is to be appreciated that the base station and/or the user device can employ the systems (FIGS. 7-9) and/or methods (FIGS. 4-6) described herein to facilitate wireless communication there between.

Referring now to FIG. 9, on a downlink, at access point 905, a transmit (TX) data processor 910 receives, formats, codes, interleaves, and modulates (or symbol maps) traffic data and provides modulation symbols ("data symbols"). A symbol modulator 915 receives and processes the data symbols and pilot symbols and provides a stream of symbols. Symbol modulator 915 multiplexes data and pilot symbols and provides them to a transmitter unit (TMTR) 920. Each transmit symbol may be a data symbol, a pilot symbol, or a signal value of zero. The pilot symbols may be sent continuously in each symbol period. The pilot symbols can be frequency division multiplexed (FDM), orthogonal frequency division multiplexed (OFDM), time division multiplexed (TDM), frequency division multiplexed (FDM), or code division multiplexed (CDM).

TMTR 920 receives and converts the stream of symbols into one or more analog signals and further conditions (e.g., amplifies, filters, and frequency upconverts) the analog signals to generate a downlink signal suitable for transmission over the wireless channel. The downlink signal is then transmitted through an antenna 925 to the user devices. At user device 930, an antenna 935 receives the downlink signal and provides a received signal to a receiver unit (RCVR) 940. Receiver unit 940 conditions (e.g., filters, amplifies, and frequency downconverts) the received signal and digitizes the conditioned signal to obtain samples. A symbol demodulator 945 demodulates and provides received pilot symbols to a processor 950 for channel estimation and CQI calculations. Symbol demodulator 945 further receives a frequency response estimate for the downlink from processor 950, performs data demodulation on the received data symbols to obtain data symbol estimates (which are estimates of the transmitted data symbols), and provides the data symbol estimates to an RX data processor 955, which demodulates (i.e., symbol demaps), deinterleaves, and decodes the data symbol estimates to recover the transmitted traffic data. The processing by symbol demodulator 945 and RX data processor 955 is complementary to the processing by symbol modulator 915 and TX data processor 910, respectively, at access point 905.

On the uplink, a TX data processor 960 processes traffic data and provides data symbols. The data symbols can include CQI data based upon the received pilot. A symbol modulator 965 receives and multiplexes the data symbols with pilot symbols, performs modulation, and provides a stream of symbols. A transmitter unit 970 then receives and processes the stream of symbols to generate an uplink signal, which is transmitted by the antenna 935 to the access point 905.

At access point 905, the uplink signal from user device 930 is received by the antenna 925 and processed by a receiver unit 975 to obtain samples. A symbol demodulator 980 then processes the samples and provides received pilot symbols and data symbol estimates for the uplink. An RX data processor 985 processes the data symbol estimates to recover the traffic data transmitted by user device 930. A processor 990 performs channel estimation for each active user device transmitting on the uplink. Multiple user devices may transmit pilot concurrently on the uplink on their respective assigned sets of pilot subbands, where the pilot subband sets may be interlaced.

Processors 990 and 950 direct (e.g., control, coordinate, manage, etc.) operation at access point 905 and user device 930, respectively. Respective processors 990 and 950 can be associated with memory units (not shown) that store program codes and data. Processors 990 and 950 can utilize any of the methodologies described herein, including those illustrated in FIGS. 4-6 to select a scheduling technique or beam assignment for the user device 930. Respective Processors 990 and 950 can also perform computations to derive frequency and impulse response estimates for the uplink and downlink, respectively.

For a multiple-access system (e.g., FDMA, OFDMA, CDMA, TDMA, SDMA, etc.), multiple user devices can transmit concurrently on the uplink. For such a system, the pilot subbands may be shared among different user devices. The channel estimation techniques may be used in cases where the pilot subbands for each user device span the entire operating band (possibly except for the band edges). Such a pilot subband structure would be desirable to obtain frequency diversity for each user device. The techniques described herein may be implemented by various means. For example, these techniques may be implemented in hardware, software, or a combination thereof. For a hardware implementation, the processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors 990 and 950.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor by various means as is known in the art.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for enhancing performance for a wireless communication environment, comprising:
   generating a first pilot;
   transmitting the first pilot;
   receiving first and second channel quality indicators (CQIs) based at least in part upon the first pilot;
   scheduling a first user device based at least in part upon the first CQI, said scheduling being selected from a plurality of scheduling techniques including spatial division multiplexing (SDM) and (MIMO) and opportunistic beamforming scheduling techniques to schedule the first user device; and
   scheduling a second user device based at least in part upon the second CQI with a scheduling technique different than that selected to schedule the first user device.

2. The method of claim 1, further comprising assigning a user device to a beam based upon the at least one of the CQIs.

3. The method of claim 1, further comprising using a signal to interference to noise ratio (SINR) as one or more of the CQIs.

4. The method of claim 1, further comprising using a supportable rate over the channel as one or more of the CQIs.

5. The method of claim 1, wherein the first pilot is transmitted on a first beam and further comprising: generating a second pilot; transmitting the second pilot on a second beam; and receiving a third CQI based at least in part upon the second pilot.

6. The method of claim 1, wherein the first pilot is transmitted over an area including a plurality of beams.

7. The method of claim 6, wherein at least one of the CQIs is based at least in part upon a set of beam weights.

8. The method of claim 7, further comprising utilizing the set of beam weights.

9. The method of claim 1, wherein at least one of the CQIs is received every frame.

10. The method of claim 1, wherein at least one of the CQIs is received based upon at least one of spatial division multiplexing (SDM), multiple input multiple output (MIMO) and opportunistic beamforming scheduling.

11. The method of claim 1, further comprising receiving a control channel CQI.

12. The method of claim 11, wherein the first pilot is transmitted on an antenna.

13. The method of claim 1, further comprising modifying a beam based at least in part upon the at least one of the CQIs.

14. A wireless communication apparatus comprising:
    a processor configured to generate a first pilot, transmit the first pilot,
    receive first and second channel quality indicators (CQIs) based at least in part upon the first pilot,
    a first user device based at least in part upon the first CQI, said scheduling being selected from a plurality of scheduling techniques including spatial division multiplexing (SDM) and (MIMO) and opportunistic beamforming scheduling techniques to schedule the first user device, and
    schedule a second user device based at least in part upon the second CQI with a scheduling technique different than that selected to schedule the first user device; and
    a memory coupled with the processor.

15. The wireless apparatus of claim 14, wherein the processor is configured to assign assigns a user device to a beam based upon the at least one CQI.

16. The wireless apparatus of claim 14, wherein at least one of the CQIs is at least one of a signal to interference to noise ratio (SINR) and a supportable rate over the channel.

17. The wireless apparatus of claim 14, wherein the processor is configured to generate a second pilot, transmit the second pilot and receive a third CQI based at least in part upon the second pilot.

18. The wireless apparatus of claim 14, the processor is configured to transmit the first pilot over an area including a plurality of beams.

19. The wireless apparatus of claim 18, wherein at least one of the CQIs is based at least in part upon a set of beam weights stored in the memory.

20. The wireless apparatus of claim 19, wherein the processor is configured to utilize the set of beam weights.

21. The wireless apparatus of claim 14, wherein the processor is configured to receive at least one of the CQIs in every frame.

22. The wireless apparatus of claim 14, wherein the processor is configured to receive at least one of the CQIs based upon at least one of spatial division multiplexing (SDM), multiple input multiple output (MIMO) and opportunistic beamforming scheduling.

23. The wireless apparatus of claim 14, wherein the processor is configured to receive a control channel CQI.

24. The wireless apparatus of claim 23, wherein the processor is configured to transmit the first pilot through an antenna.

25. A wireless communication apparatus for enhancing performance for a wireless communication environment, comprising:
   means for generating a first pilot;
   means for transmitting the first pilot;
   means for receiving first and second channel quality indicators (CQIs) based at least in part upon the first pilot;
   means for scheduling a first user device based at least in part upon the first CQI, said scheduling being selected from a plurality of scheduling techniques including spatial division multiplexing (SDM) and (MIMO) and opportunistic beamforming scheduling techniques to schedule the first user device; and
   means for scheduling a second user device based at least in part upon the second CQI with a scheduling technique different than that selected to schedule the first user device.

26. The apparatus of claim 25, further comprising:
   means for generating a second pilot;
   means for transmitting the second pilot on a second beam; and
   means for receiving a third CQI based at least in part upon the second pilot.

27. The apparatus of claim 25, further comprising means for receiving a control channel CQI.

28. The apparatus of claim 25, further comprising means for utilizing a set of beam weights, wherein at least one of the CQIs is based at least in part upon the set of beam weights.

29. The apparatus of claim 25, further comprising means for modifying a beam based at least in part upon the at least one of the CQIs.

30. A non-transitory computer-readable medium having stored thereon computer-executable instructions for:
   generating a first pilot;
   transmitting the first pilot;
   receiving first and second channel quality indicators (CQIs) based at least in part upon the first pilot;
   scheduling a first user device based at least in part upon the first CQI, said scheduling being selected from a plurality of scheduling techniques including spatial division multiplexing (SDM) and (MIMO) and opportunistic beamforming scheduling techniques to schedule the first user device; and
   scheduling a second user device based at least in part upon the second CQI with a scheduling technique different than that selected to schedule the first user device.

31. The computer-readable medium of claim 30, further comprising instructions for assigning a user device to a beam based upon at least one of the CQIs.

32. The computer-readable medium of claim 30, further comprising instructions for:
   generating a second pilot;
   transmitting the second pilot on a second beam; and
   receiving a third CQI based at least in part upon the second pilot.

33. A processor that executes instructions for enhancing performance for a wireless communication environment, the instructions comprising:
   generating a first pilot;
   transmitting the first pilot;
   receiving first and second channel quality indicators (CQIs) based at least in part upon the first pilot;
   scheduling a first a user device based at least in part upon the first CQI, said scheduling being selected from a plurality of scheduling techniques including spatial division multiplexing (SDM) and (MIMO) and opportunistic beamforming scheduling techniques to schedule the first user device; and
   scheduling a second user device based at least in part upon the second CQI with a scheduling technique different than that selected to schedule the first user device.

34. The processor of claim 33, further comprising:
   generating a second pilot;
   transmitting the second pilot on a second beam; and
   receiving a third CQI based at least in part upon the second pilot.

35. A mobile device that facilitates communicating over a wireless network, comprising:
   a component that generates a first pilot;
   a component that transmits the first pilot;
   a component that receives first and second channel quality indicators (CQIs) based at least in part upon the first pilot; and
   a component that schedules a first user device based at least in part upon the first CQI, said scheduling being selected from a plurality of scheduling techniques including spatial division multiplexing (SDM) and (MIMO) and opportunistic beamforming scheduling techniques to schedule the first user device; and
   a component that schedules a second user device based at least in part upon the second CQI with a scheduling technique different than that selected to schedule the first user device.

36. The mobile device of claim 35, wherein the device is at least one of a cellular phone, a smartphone, a handheld communication device, a handheld computing device, a satellite radio, a global positioning system, a laptop, and a PDA.

* * * * *